US011217112B2

(12) United States Patent
Tao et al.

(10) Patent No.: US 11,217,112 B2
(45) Date of Patent: *Jan. 4, 2022

(54) SYSTEM AND METHOD FOR SUPPORTING SIMULATED MOVEMENT

(71) Applicant: SZ DJI TECHNOLOGY CO., LTD., Shenzhen (CN)

(72) Inventors: Ye Tao, Shenzhen (CN); Shunnian Li, Shenzhen (CN); Zhiyuan Zhang, Shenzhen (CN); Liutao Zhang, Shenzhen (CN); Weifeng Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 540 days.

This patent is subject to a terminal disclaimer.

(21) Appl. No.: 16/177,749

(22) Filed: Nov. 1, 2018

(65) Prior Publication Data

US 2019/0073918 A1 Mar. 7, 2019

Related U.S. Application Data

(63) Continuation of application No. 15/349,893, filed on Nov. 11, 2016, now Pat. No. 10,134,298, which is a
(Continued)

(51) Int. Cl.
*G09B 9/08* (2006.01)
*G09B 9/24* (2006.01)
(Continued)

(52) U.S. Cl.
CPC ................. *G09B 9/08* (2013.01); *G09B 9/24* (2013.01); *G09B 9/302* (2013.01); *G09B 9/46* (2013.01)

(58) Field of Classification Search
CPC ........ A63F 13/803; A63F 13/10; A63F 13/12; A63F 2300/8017; G09B 9/08; G09B 9/12; G09B 9/02; B64C 2201/146
See application file for complete search history.

(56) References Cited

U.S. PATENT DOCUMENTS

| 3,220,121 A | 11/1965 | Ernest |
| 5,947,824 A | 9/1999 | Minami et al. |

(Continued)

FOREIGN PATENT DOCUMENTS

| CA | 2872698 A1 | 11/2013 |
| CN | 1356529 A | 7/2002 |

(Continued)

OTHER PUBLICATIONS

The World Intellectual Property Organization (WIPO) International Search Report and Written Opinion for PCT/CN2015/082415 dated Oct. 8, 2015 7 pages.
(Continued)

*Primary Examiner* — Jerry-Daryl Fletcher
(74) *Attorney, Agent, or Firm* — Anova Law Group, PLLC

(57) ABSTRACT

A method includes receiving state information of a virtual movable object in a simulated movement from a movement simulator associated with a movable object and determining movement information for the simulated movement by associating the state information with context information. The state information includes information identifying a location of the virtual movable object in a virtual space. The context information includes information identifying a location of the user terminal, which is at a different location than the movable object in a real space. The method further includes displaying the simulated movement on a display associated with the user terminal based on the movement information, and receiving control data to control the simu-
(Continued)

lated movement in the virtual space using the user terminal when the movable object is in simulation and to control movement of the movable object in the real space when the movable object is in real operation.

20 Claims, 14 Drawing Sheets

Related U.S. Application Data continuation of application No. PCT/CN2015/082415, filed on Jun. 26, 2015, and a continuation of application No. PCT/CN2014/089605, filed on Oct. 27, 2014, said application No. 15/349,893 is a continuation of application No. PCT/CN2014/088051, filed on Sep. 30, 2014.

(51) Int. Cl.
G09B 9/30 (2006.01)
G09B 9/46 (2006.01)

(56) References Cited

U.S. PATENT DOCUMENTS

| 6,527,225 | B1 | 3/2003 | Silder et al. |
|---|---|---|---|
| 7,706,979 | B1 | 4/2010 | Herwitz |
| 7,959,111 | B1 | 6/2011 | Dirks et al. |
| 7,970,532 | B2 | 6/2011 | Tehan et al. |
| 8,068,983 | B2 | 11/2011 | Vian et al. |
| 8,195,025 | B2 | 6/2012 | Branam et al. |
| 8,239,047 | B1 | 8/2012 | Bergeron |
| 8,509,965 | B2 | 8/2013 | Lin |
| 8,874,283 | B1 | 10/2014 | Cavote et al. |
| 8,942,964 | B2 | 1/2015 | Mcwilliams et al. |
| 8,954,853 | B2 | 2/2015 | Lacaze et al. |
| 9,589,476 | B2 | 3/2017 | Zhang et al. |
| 2002/0087296 | A1 | 7/2002 | Wynn |
| 2003/0211806 | A1 | 11/2003 | Paterson |
| 2006/0091258 | A1 | 5/2006 | Chiu et al. |
| 2006/0102798 | A1 | 5/2006 | Cox et al. |
| 2006/0223637 | A1 | 10/2006 | Rosenberg |
| 2006/0227047 | A1 | 10/2006 | Rosenberg |
| 2007/0243505 | A1 | 10/2007 | Rath et al. |
| 2008/0147366 | A1 | 6/2008 | Schutz et al. |
| 2008/0243383 | A1 | 10/2008 | Lin |
| 2009/0069957 | A1 | 3/2009 | Nakamura |
| 2009/0115636 | A1 | 5/2009 | Shibata |
| 2009/0187338 | A1 | 7/2009 | Fregene |
| 2010/0001902 | A1 | 1/2010 | Smith |
| 2010/0084513 | A1 | 4/2010 | Gariepy |
| 2011/0301925 | A1 | 12/2011 | Mcwilliams et al. |
| 2013/0035805 | A1 | 2/2013 | Spinelli |
| 2013/0066550 | A1 | 3/2013 | Takada |
| 2013/0085629 | A1 | 4/2013 | Washington et al. |
| 2013/0211691 | A1 | 8/2013 | Evra et al. |
| 2014/0008496 | A1 | 1/2014 | Ye et al. |
| 2014/0018979 | A1 | 1/2014 | Goossen et al. |
| 2014/0032034 | A1 | 1/2014 | Raptopoulos et al. |
| 2014/0067162 | A1 | 3/2014 | Paulsen et al. |
| 2014/0113255 | A1 | 4/2014 | Lechner et al. |
| 2014/0221061 | A1 | 8/2014 | Sitnikau |
| 2014/0222248 | A1 | 8/2014 | Levien et al. |
| 2014/0257596 | A1 | 9/2014 | Paulsen et al. |
| 2014/0263823 | A1 | 9/2014 | Wang et al. |
| 2015/0002391 | A1 | 1/2015 | Chen et al. |
| 2015/0064657 | A1 | 3/2015 | Hales et al. |
| 2015/0064658 | A1 | 3/2015 | Hales et al. |
| 2015/0199086 | A1 | 7/2015 | Churchill et al. |
| 2015/0298017 | A1 | 10/2015 | Curley et al. |
| 2015/0302756 | A1 | 10/2015 | Guehring et al. |

FOREIGN PATENT DOCUMENTS

| CN | 1953547 A | 4/2007 |
|---|---|---|
| CN | 201004174 Y | 1/2008 |
| CN | 101142122 A | 3/2008 |
| CN | 101180214 A | 5/2008 |
| CN | 101226392 A | 7/2008 |
| CN | 101241653 A | 8/2008 |
| CN | 101419461 A | 4/2009 |
| CN | 101504287 A | 8/2009 |
| CN | 101593437 A | 12/2009 |
| CN | 101604830 A | 12/2009 |
| CN | 101650866 A | 2/2010 |
| CN | 102193599 A | 9/2011 |
| CN | 202094531 U | 12/2011 |
| CN | 202494448 U | 10/2012 |
| CN | 202533754 U | 11/2012 |
| CN | 102982515 A | 3/2013 |
| CN | 103149846 A | 6/2013 |
| CN | 103344250 A | 10/2013 |
| CN | 103345826 A | 10/2013 |
| CN | 103365214 A | 10/2013 |
| CN | 103365298 A | 10/2013 |
| CN | 103424126 A | 12/2013 |
| CN | 103488179 A | 1/2014 |
| CN | 203551961 U | 4/2014 |
| CN | 103822635 A | 5/2014 |
| CN | 104002743 A | 8/2014 |
| CN | 106508011 B | 8/2014 |
| CN | 104029825 A | 9/2014 |
| GB | 2370818 B | 1/2004 |
| JP | 2003127994 A | 5/2003 |
| JP | 2004101616 A | 4/2004 |
| JP | 2006281830 A | 10/2006 |
| JP | 2007093045 A | 4/2007 |
| JP | 2010117656 A | 5/2010 |
| JP | 2012509812 A | 4/2012 |
| JP | 5767731 B1 | 8/2015 |
| WO | 2014108026 A1 | 7/2014 |

OTHER PUBLICATIONS

The World Intellectual Property Organization (WIPO) International Search Report and Written Opinion for PCT/CN2014/088051 dated Jun. 30, 2015 8 pages.
European Patent Office (EPO) Extended European Search Report for 14903341.7 dated Mar. 27, 2017.
The United States Patent and Trademark Office (USPTO) Final Office Action for U.S. Appl. No. 14/936,532 dated Sep. 1, 2016.
The United States Patent and Trademark Office Final Office Action for U.S. Appl. No. 14/936,532 dated Feb. 26, 2016.
NitroPlanes. New RC Tech 6 CH Flight Simulator Remote Control for Helicopters/ Airplanes. Http://www.nitroplanes.com/newrcte6chfl.html Jun. 1, 2018.
The World Intellectual Property Organization (WIPO) International Search Report and Written Opinion for PCT/CN2014/089605 dated Jul. 3, 2015 9 pages.
The United States Patent and Trademark Office (USPTO) Notice of Allowance for U.S. Appl. No. 14/883,380 dated Jan. 30, 2018.
The United States Patent and Trademark Office (USPTO) Office Action for U.S. Appl. No. 14/883,380 dated Feb. 2, 2016.
The United States Patent and Trademark Office (USPTO) Office Action for U.S. Appl. No. 14/883,380 dated Mar. 17, 2017.
Nicholas Neveu, et al., Miniature Hexaferrite Axial-Mode Helical Antenna for Unmanned Aerial Vehicle Applications, IEEE Transactions on Magnetics, Jul. 2013, pp. 4265-4268, vol. 49, No. 7.
Chun-Hui Liu, et al., Design of Double-Mode Ground Manipulation System for Unmanned Helicopter, Aero Weapon, Aug. 2009, pp. 24-27, 32, No. 4.

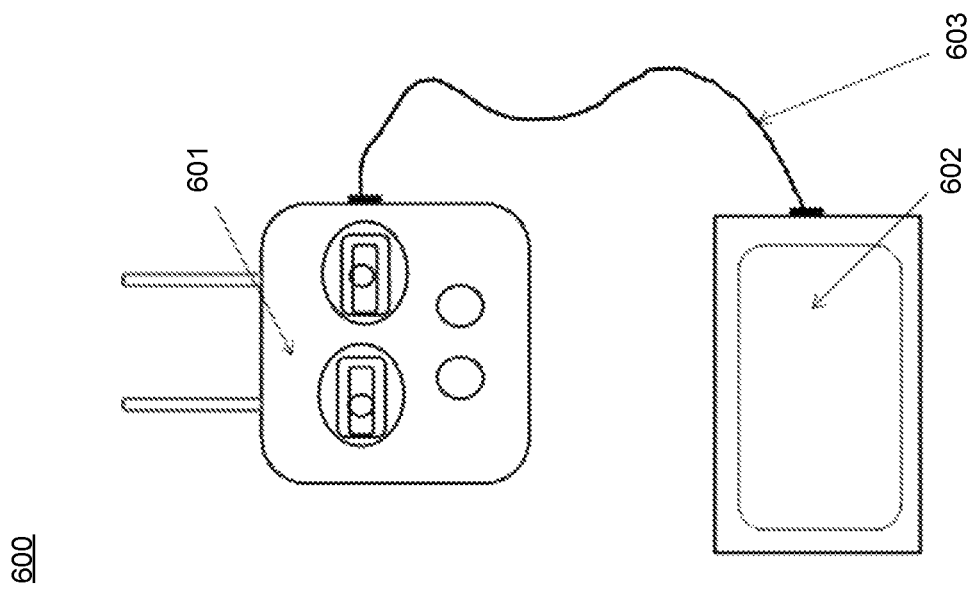
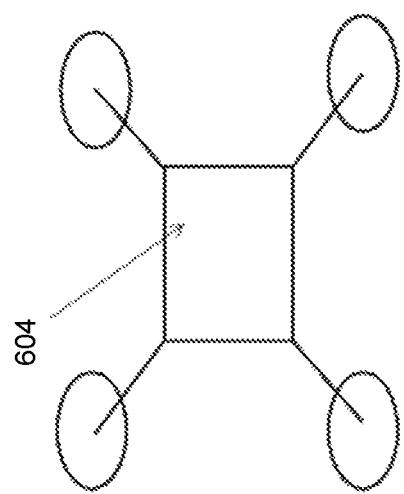
FIG. 6

SYSTEM AND METHOD FOR SUPPORTING SIMULATED MOVEMENT

CROSS-REFERENCE TO RELATED APPLICATIONS

This application is a continuation of application Ser. No. 15/349,893, filed on Nov. 11, 2016, which is a continuation of International Application No. PCT/CN2015/082415, filed on Jun. 26, 2015, International Application No. PCT/CN2014/089605 filed on Oct. 27, 2014, and International Application No. PCT/CN2014/088051, filed on Sep. 30, 2014, the entire contents of all of which are hereby incorporated by reference.

BACKGROUND OF THE DISCLOSURE

The disclosed embodiments relate generally to, but not exclusively, to a movable object environment.

Movable objects such as unmanned aerial vehicles (UAVs) can travel along defined routes. UAVs can be controlled entirely or partially by a user off-board the UAV. A user can practice controlling a UAV using a simulation that depicts a UAV in a simulated environment in response to flight control commands from a user.

Learning to control a UAV can be difficult. Failure to properly control a UAV can result in damage to the UAV. Repairing damage to the UAV can be time consuming and expensive therefore it may be advantageous to teach a user to control a UAV in a virtual environment where a real UAV is not at risk of damage.

This is the general area that embodiments of the disclosure are intended to address.

BRIEF SUMMARY OF THE DISCLOSURE

Described herein are systems and methods that can support a simulated flight of an unmanned aircraft vehicle (UAV). A process, which can be on a user terminal, can receive state information about the simulated flight from a flight simulator that is associated with the UAV. Then, the process can determine flight information for the simulated flight by associating the received state information with context information obtained by the process on the user terminal, and provides the determined flight information to a display that is associated with the user terminal.

Also described herein are systems and methods that can support a simulated movement of a movable object. A process, which can be on a user terminal, can receive state information about the simulated movement from a movement simulator that is associated with the movable object. Then, the process can determine movement information for the simulated movable object by associating the received state information with context information obtained by the process on the user terminal, and provides the determined flight information to a display that is associated with the user terminal.

Other objects and features of the present disclosure will become apparent by a review of the specification, claims, and appended figures.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings briefly described herein.

FIG. 6 shows various exemplary components of a realistic flight simulation environment, in accordance with various embodiments of the present disclosure.

DETAILED DESCRIPTION OF THE DISCLOSURE

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the disclosure as following uses an unmanned aerial vehicle (UAV) as example for a movable object. It will be apparent to those skilled in the art that other types of movable objects can be used without limitation.

The systems, devices, and methods of the present disclosure provide mechanisms training a user to fly and control an unmanned aerial vehicle (UAV) in a virtual environment. The skills obtained by the user from flying the UAV in the virtual environment can be directly applicable to flying a UAV in a real environment. The systems, devices, and methods of the present disclosure further provide a simulation platform that employs at least some components that can be used for real flight of the UAV. Description of the UAV may be applied to any other type of unmanned vehicle, or any other type of movable object.

Movable Object Environment

Figure 1:
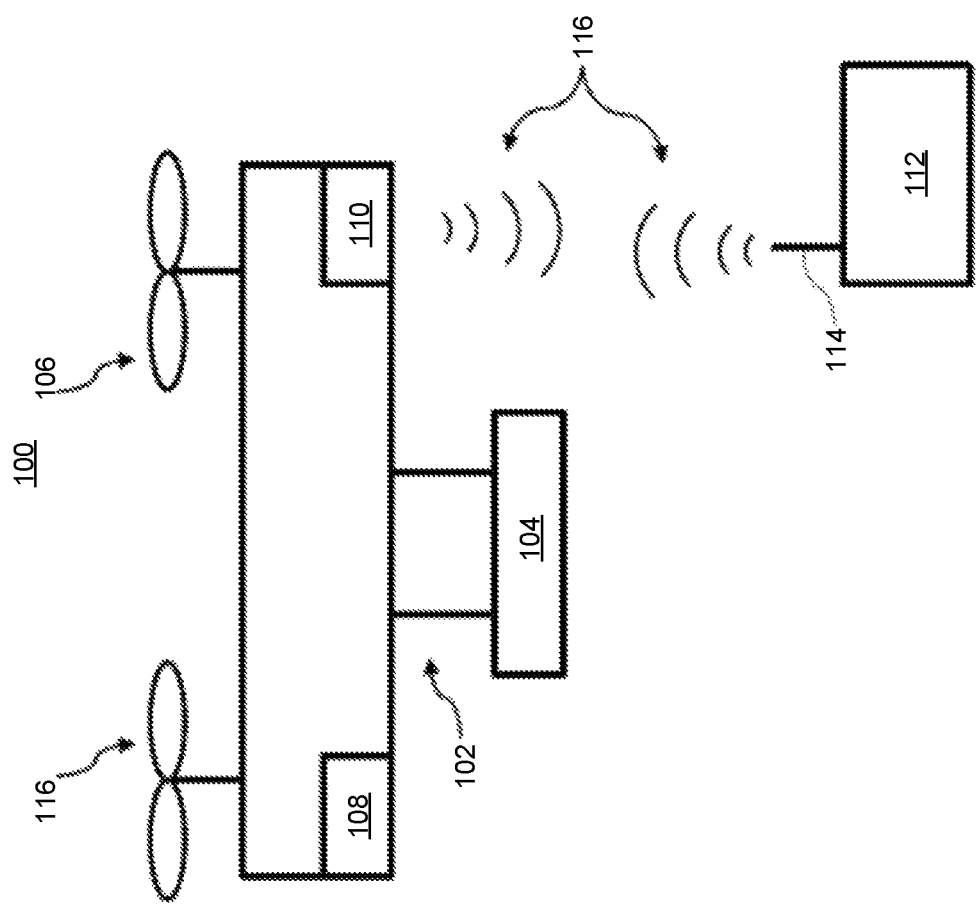
FIG. 1 illustrates a movable object environment, in accordance with various embodiments of the present disclosure.

FIG. 1 illustrates a movable object environment, in accordance with various embodiments of the present disclosure. As shown in FIG. 1, a movable object 100 can include a carrier 102 and a payload 104. Although the movable object 100 can be depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 104 may be provided on the movable object 100 without requiring the carrier 102. The movable object 100 may include propulsion mechanisms 106, a sensing system 108, and a communication system 110.

The propulsion mechanisms 106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 106 can be mounted on the movable object 100 using any suitable means, such as a support element (e.g., a drive shaft) as described elsewhere herein. The propulsion mechanisms 106 can be mounted on any suitable portion of the movable object 100, such on the top, bottom, front, back, sides, or suitable combinations thereof.

In some embodiments, the propulsion mechanisms 106 can enable the movable object 100 to take off vertically from a surface or land vertically on a surface without requiring any horizontal movement of the movable object 100 (e.g., without traveling down a runway). Optionally, the propulsion mechanisms 106 can be operable to permit the movable object 100 to hover in the air at a specified position and/or orientation. One or more of the propulsion mechanism 100 may be controlled independently of the other propulsion mechanisms. Alternatively, the propulsion mechanisms 100 can be configured to be controlled simultaneously. For example, the movable object 100 can have multiple horizontally oriented rotors that can provide lift and/or thrust to the movable object. The multiple horizontally oriented rotors can be actuated to provide vertical takeoff, vertical landing, and hovering capabilities to the movable object 100. In some embodiments, one or more of the horizontally oriented rotors may spin in a clockwise direction, while one or more of the horizontally rotors may spin in a counter-clockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 100 (e.g., with respect to up to three degrees of translation and up to three degrees of rotation).

The sensing system 108 can include one or more sensors that may sense the spatial disposition, velocity, and/or acceleration of the movable object 100 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 108 can be used to control the spatial disposition, velocity, and/or orientation of the movable object 100 (e.g., using a suitable processing unit and/or control module, as described below). Alternatively, the sensing system 108 can be used to provide data regarding the environment surrounding the movable object, such as weather conditions, proximity to potential obstacles, location of geographical features, location of manmade structures, and the like.

The communication system 110 enables communication with terminal 112 having a communication system 114 via wireless signals 116. The communication systems 110, 114 may include any number of transmitters, receivers, and/or transceivers suitable for wireless communication. The communication may be one-way communication, such that data can be transmitted in only one direction. For example, one-way communication may involve only the movable object 100 transmitting data to the terminal 112, or vice-versa. The data may be transmitted from one or more transmitters of the communication system 110 to one or more receivers of the communication system 112, or vice-versa. Alternatively, the communication may be two-way communication, such that data can be transmitted in both directions between the movable object 100 and the terminal 112. The two-way communication can involve transmitting data from one or more transmitters of the communication system 110 to one or more receivers of the communication system 114, and vice-versa.

In some embodiments, the terminal 112 can provide control data to one or more of the movable object 100, carrier 102, and payload 104 and receive information from one or more of the movable object 100, carrier 102, and payload 104 (e.g., position and/or motion information of the movable object, carrier or payload; data sensed by the payload such as image data captured by a payload camera; and data generated from image data captured by the payload camera). In some instances, control data from the terminal may include instructions for relative positions, movements, actuations, or controls of the movable object, carrier, and/or payload. For example, the control data may result in a modification of the location and/or orientation of the movable object (e.g., via control of the propulsion mechanisms 106), or a movement of the payload with respect to the movable object (e.g., via control of the carrier 102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 108 or of the payload 104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data transmitted by the terminal 112 can be configured to control a state of one or more of the movable object 100, carrier 102, or payload 104. Alternatively or in combination, the carrier 102 and payload 104 can also each include a communication module configured to communicate with terminal 112, such that the terminal can communicate with and control each of the movable object 100, carrier 102, and payload 104 independently.

In some embodiments, the movable object 100 can be configured to communicate with another remote device in addition to the terminal 112, or instead of the terminal 112. The terminal 112 may also be configured to communicate with another remote device as well as the movable object 100. For example, the movable object 100 and/or terminal 112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 100, receive data from the movable object 100, transmit data to the terminal 112, and/or receive data from the terminal 112. Optionally, the remote device can be connected to the Internet or other telecommunications network, such that data received from the movable object 100 and/or terminal 112 can be uploaded to a website or server.

Figure 2:
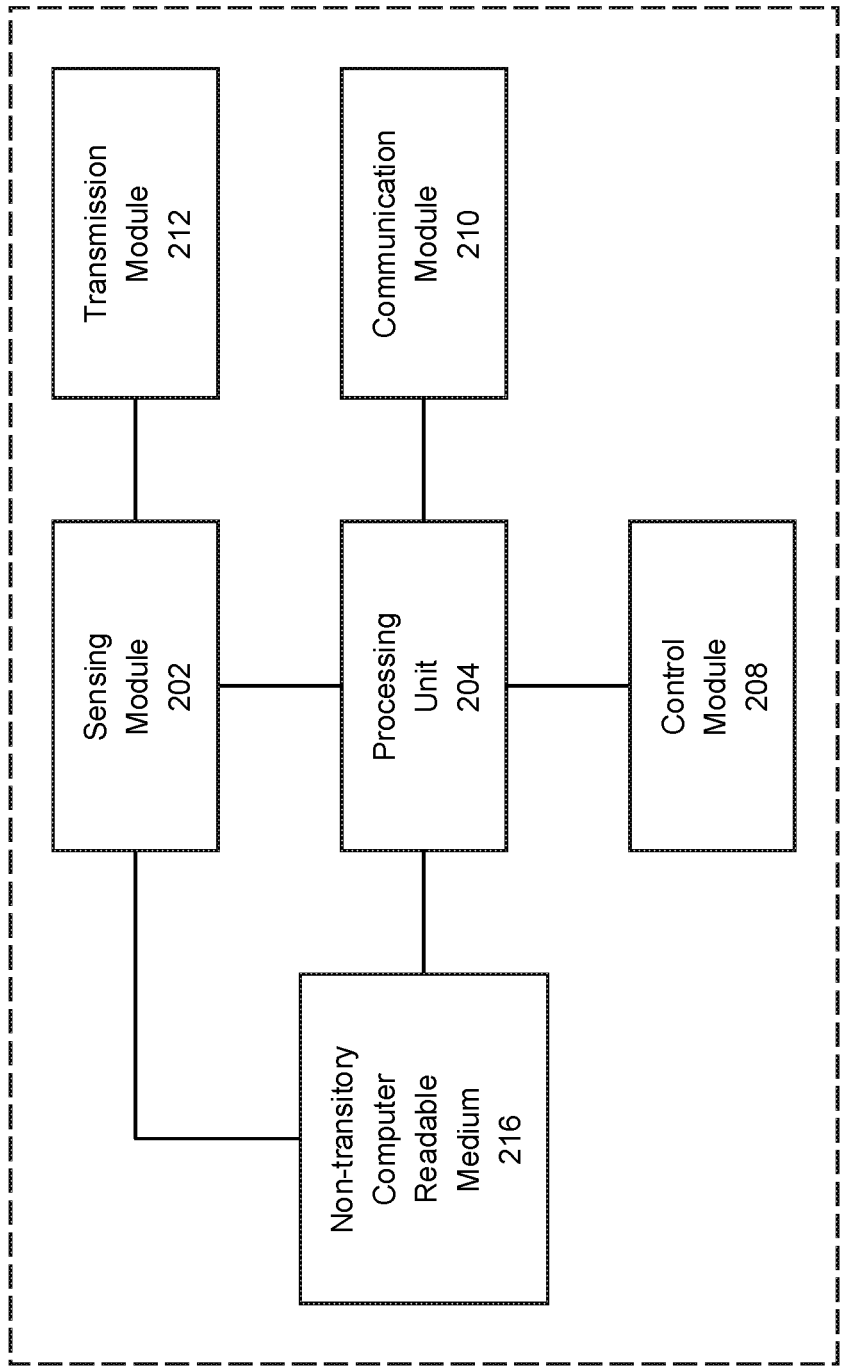
FIG. 2 illustrates an exemplary system 200 for controlling a UAV, in accordance with embodiments.

FIG. 2 illustrates an exemplary system 200 for controlling a UAV, in accordance with embodiments. The system 200 can be used in combination with any suitable embodiment of the systems, devices, and methods disclosed herein. For example, the system 200 may be implemented or carried by a movable object. The system 200 can include a sensing module 202, processing unit 204, non-transitory computer readable medium 206, control module 208, and communication module 210.

The sensing module 202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 202 can be operatively coupled to a processing unit 204 having a plurality of processors. In some embodiments, the sensing module can be operatively coupled to a transmission module 212 (e.g., a Wi-Fi image transmission module) configured to directly transmit sensing data to a suitable external device or system. For example, the transmission module 212 can be used to transmit images captured by a camera of the sensing module 202 to a remote terminal.

The processing unit 204 can have one or more processors, such as a programmable processor (e.g., a central processing unit (CPU)). For example, the processing unit 204 may include a field programmable gate array (FPGA) and/or one or more ARM processors. The processing unit 204 can be operatively coupled to a non-transitory computer readable medium 206. The non-transitory computer readable medium 206 can store logic, code, and/or program instructions executable by the processing unit 204 for performing one or more steps. The non-transitory computer readable medium can include one or more memory units (e.g., removable media or external storage such as an SD card or random access memory (RAM)). In some embodiments, data from the sensing module 202 can be directly conveyed to and stored within the memory units of the non-transitory computer readable medium 206. The memory units of the non-transitory computer readable medium 206 can store logic, code and/or program instructions executable by the processing unit 204 to perform any suitable embodiment of the methods described herein. For example, the processing unit 204 can be configured to execute instructions causing one or more processors of the processing unit 204 to perform one or more processes discussed herein. The memory units can store sensing data from the sensing module to be processed by the processing unit 204. In some embodiments, the memory units of the non-transitory computer readable medium 206 can be used to store the processing results produced by the processing unit 204.

In some embodiments, the processing unit 204 can be operatively coupled to a control module 208 configured to control a state of the movable object. For example, the control module 208 can be configured to control the propulsion mechanisms of the movable object to adjust the spatial disposition, velocity, and/or acceleration of the movable object with respect to six degrees of freedom. For example, the control module 208 can be configured to cause a UAV to maintain a hover position. Alternatively or in combination, the control module 208 can control one or more of a state of a carrier, payload, or sensing module. For example, the control module 208 can be used to control the carrier so as to rotate the payload (e.g., an image capturing device) around a first axis (e.g., Y or yaw) while maintaining a predetermined disposition (e.g., leveled position). The control module 208 can also be used to control the payload to capture a plurality of images at predetermined intervals while the payload is being rotated.

The processing unit 204 can be operatively coupled to a communication module 210 configured to transmit and/or receive data from one or more external devices (e.g., a terminal, display device, or other remote controller). Any suitable means of communication can be used, such as wired communication or wireless communication. For example, the communication module 210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 210 can transmit and/or receive one or more of sensing data from the sensing module 202, and/or processing results produced by the processing unit 204, predetermined control data or user commands from a terminal or remote controller, and the like.

Figure 10:
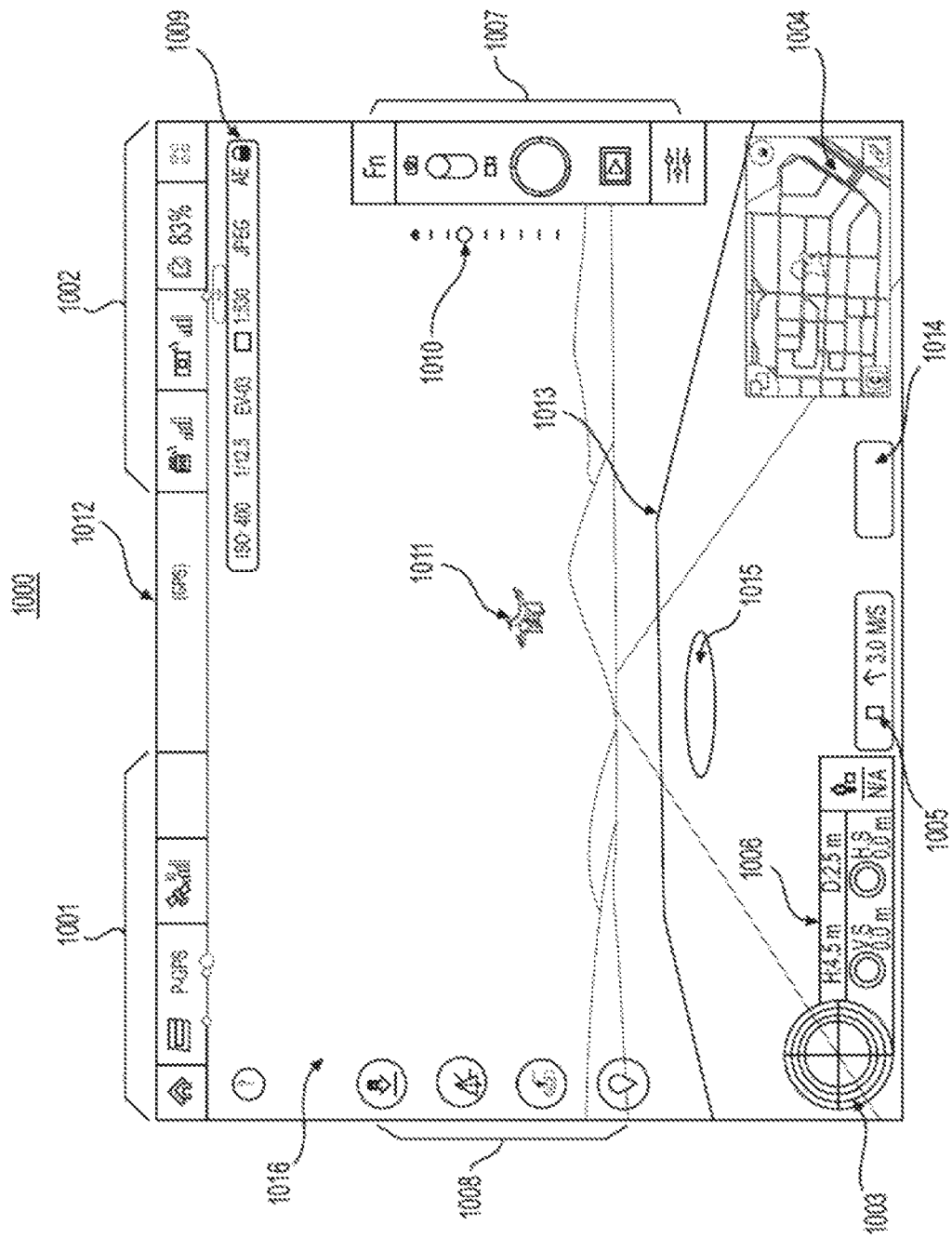
FIG. 10 illustrates an exemplary user interface (UI) for displaying a simulated flight after a UAV is taken-off, in accordance with various embodiments of the present disclosure.

The components of the system 200 can be arranged in any suitable configuration. For example, one or more of the components of the system 200 can be located on the movable object, carrier, payload, terminal, sensing system, or an additional external device in communication with one or more of the above. Additionally, although FIG. 10 depicts a single processing unit 204, a single non-transitory computer readable medium 206, and a single control module 208, one of skill in the art would appreciate that this is not intended to be limiting, and that the system 200 can include a plurality of processing units, control modules, and/or non-transitory computer readable media. In some embodiments, one or more of the plurality of processing units, control modules, and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

Figure 3:
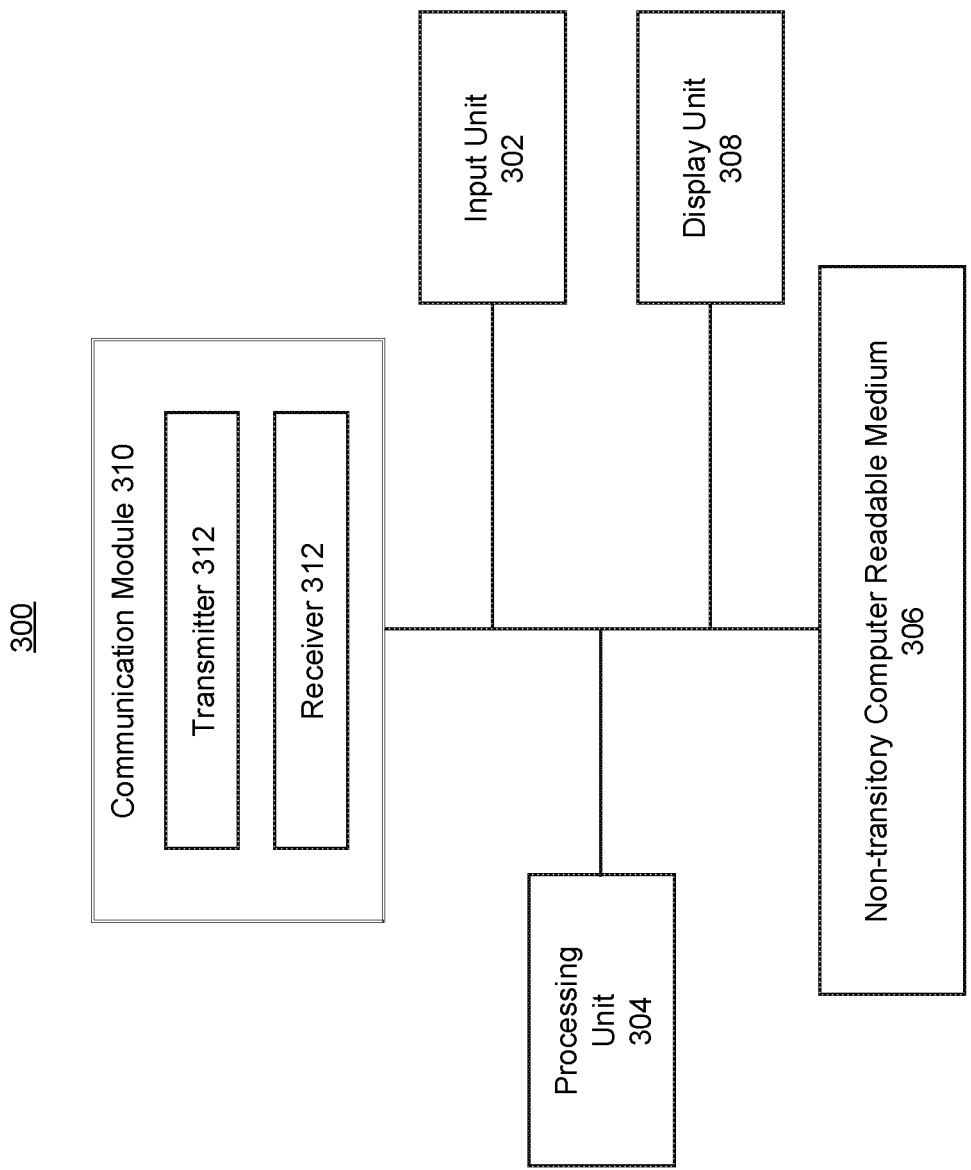
FIG. 3 illustrates an exemplary system 300 implemented by a remote terminal, in accordance with embodiments.

FIG. 3 illustrates an exemplary system 300 implemented by a remote terminal, in accordance with embodiments. The system 300 can be used to control a movable object such as a UAV and/or for displaying information related to the UAV. The remote terminal can be a remote control terminal, a remote display terminal, or a terminal that combines the functionality of both. The system 300 can be used in combination with any suitable embodiment of the systems, devices, and methods disclosed herein. The system 300 can include an input module 302, a processing unit 304, a non-transitory computer readable medium 306, a display module 308, and a communication module 310, all interconnected via a bus or a similar network.

The input module 302 can include one or more input mechanisms for receiving input from a user operating the input module. Such input mechanisms can include one or more joysticks, switches, knobs, slide switches, buttons, dials, touch screens, keypads, keyboard, mouse, voice controls, gesture controls, inertial sensors, and the like. Such input module 302 can be used to receive user input used to control aspects of the movable object, carrier, payload, or a component thereof. Such aspects may include attitude, position, orientation, navigation, tracking, and the like. For example, the input mechanisms can be manually set by a user to one or more positions, each of the positions corresponding to a predetermined input for controlling the UAV.

In some embodiments, the input mechanisms can be manipulated by a user to input control commands for controlling the navigation of the movable object. For instance, the user may utilize a knob, switch, or a similar input mechanism to input a flight mode for the movable object such as auto pilot or navigation according to a predetermined navigation path. As another example, the user may control the position, attitude, orientation and other aspect of the movable object by the tilting the control terminal in certain ways, which may be detected by one or more inertial sensors and used to generate the corresponding navigation commands. As yet another example, the user may use the input mechanism to adjust an operational parameter (e.g., zoom) of the payload, an attitude and/or the payload (e.g., via the carrier), or other aspects of any object onboard the movable object.

The processing unit 304 can have one or more processors, such as a programmable processor (e.g., a central processing unit (CPU) or a microcontroller). The processing unit 304 can be operatively coupled to a memory 306. The memory 306 can include transitory and/or non-transitory storage media configured to store data, and/or logic, code, and/or program instructions executable by the processing unit 1304 for performing one or more routines or functions. The memory can include one or more memory units (e.g., removable media or external storage such as an SD card or random access memory (RAM)). In some embodiments, data from the input module 302 can be directly conveyed to and stored within the memory units of the memory 306. The memory units of the memory 306 can store logic, code and/or program instructions executable by the processing unit 304 to perform any suitable embodiment of the methods described herein. For example, the processing unit 304 can be configured to execute instructions causing one or more processors of the processing unit 304 to perform one or more processes described herein. The memory units can store sensing data or other data received from external devices (e.g., movable object). In some embodiments, the memory units of the memory 306 can be used to store the processing results produced by the processing unit 304. Although FIG. 3 depicts a single processing unit 304 and a single memory 306, one of skill in the art would appreciate that this is not intended to be limiting, and that the system 1300 can include a plurality of processing units and/or memory units of the memory.

In some embodiments, the display module 1308 can be configured to display information of the movable object, carrier, and/or payload with respect to position, translational velocity, translational acceleration, orientation, angular velocity, angular acceleration, or any suitable combinations thereof. The display module 308 can be configured to display information received from the movable object and/or payload such as sensing data (e.g., images recorded by a camera or other image capturing device), processed data such as stitched images generated by processors onboard the movable object, intermediate data generated during the image stitching process, control feedback data, and the like. In some embodiments, the display module 308 may be implemented by the same device that implements the input module 302. In other embodiments, the display module 308 may be implemented by a device that is separate from (but that may be operatively coupled to) the device that implements the input module 302.

The communication module 310 can be configured to transmit and/or receive data from one or more external devices (e.g., movable object, payload, base station, remote controller, and the like). For example, the communication module 310 can be configured to transmit control data (e.g., navigation commands, control commands) to external systems or devices such as movable objects, carriers, and/or payloads. The communication module 310 can also be configured to receive data (e.g., sensing data and image stitching data) from external systems or devices. In some embodiments, the communication module 310 can include a transmitter 312 and a receiver 314 respectively configured to transmit and receive data to and from remote devices. In some embodiments, the communication module can include a transceiver that combines the functionalities of the transmitter and the receiver. In some embodiments, the transmitter and the receiver can communicate with each other as well as with the processing unit 304. Any suitable means of communication can be used, such as wired communication or wireless communication described herein.

Figure 4:
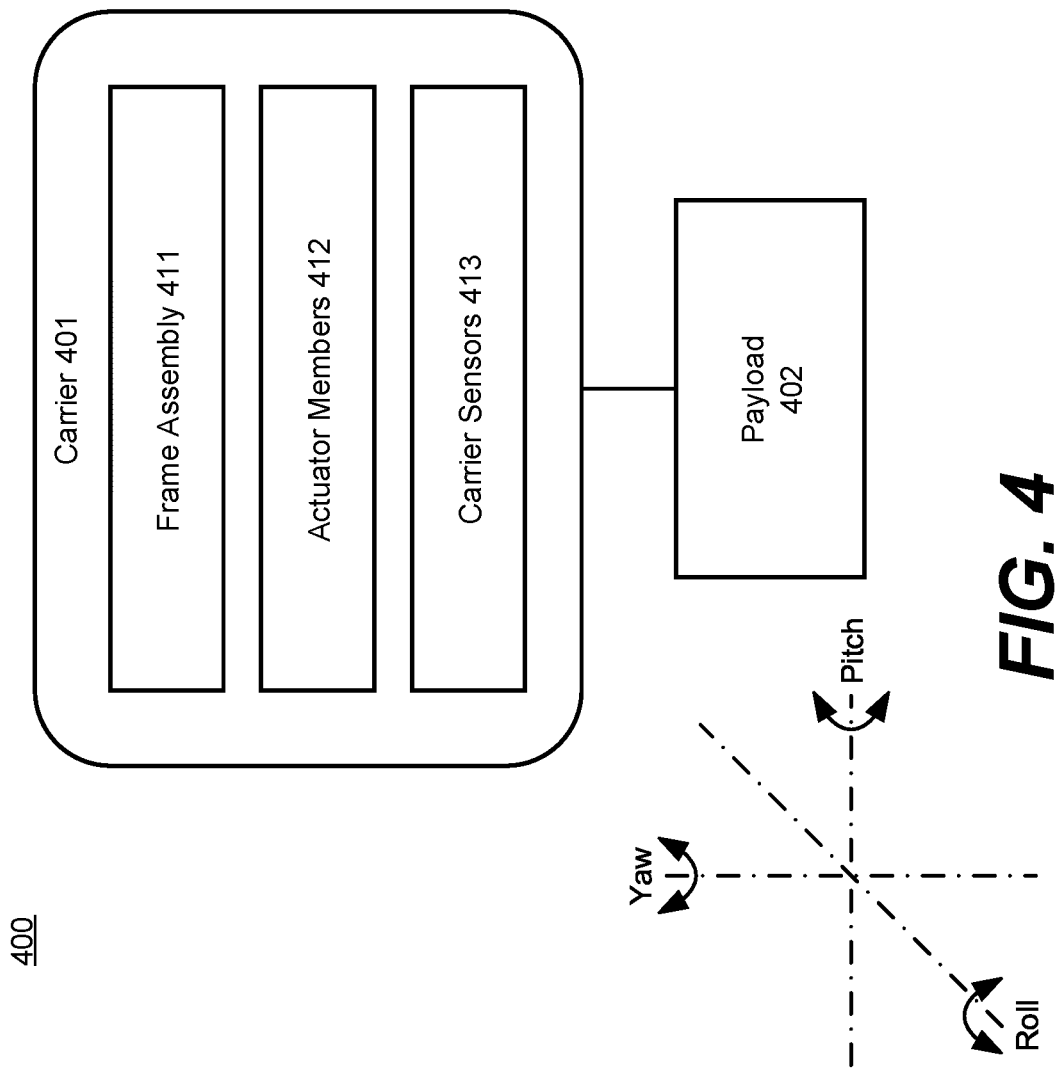
FIG. 4 illustrates an isometric view of an exemplary carrier 400, in accordance with embodiments.

FIG. 4 illustrates an isometric view of an exemplary carrier 400, in accordance with embodiments. The carrier 400 can be used to couple a payload such as an image capturing device to a movable object such as a UAV.

The carrier 400 can be configured to permit the payload to rotate around up to three axes: X or pitch axis 402, Z or roll axis 404, and Y or yaw axis 406 relative to the movable object. For instance, the carrier 400 may be configured to permit the payload to rotate only around one, two, or all three of the axes. The three axes may or may not be orthogonal to each other. The range of rotation around any of the axes may or may not be limited and may vary for each of the axes. The axes of rotation may or may not intersect with one another. For example, three orthogonal axes may intersect with one another. They may or may not intersect at a payload. Alternatively, they may not intersect.

The carrier 400 can include a frame assembly comprising a first frame member 408, a second frame member 416, a third frame member 422, and a fourth frame member 428. The first frame member 408 can be configured to be coupled with and support the payload (e.g., image capturing device).

In some embodiments, the carrier comprises one or more carrier sensors useful for determining a state of the carrier or the payload carried by the carrier. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors may be coupled to any suitable portion or portions of the carrier (e.g., frame members and/or actuator members) and may or may not be movable relative to the UAV. Additionally or alternatively, at least some of the carrier sensors may be coupled directly to the payload carried by the carrier.

The carrier sensors may be coupled with some or all of the actuator members of the carrier. For example, three carrier sensors can be respectively coupled to the actuator members 1410, 1418, and 1424 of the carrier and configured to measure the driving of the respective actuator members 1410, 1418, and 1424. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member 1410, a second potentiometer can be used to generate a second position signal for the second actuator member 1418, and a third potentiometer can be used to generate a third position signal for the third actuator member 1424. In some embodiments, carrier sensors may also be coupled to some or all of the frame members of the carrier. The sensors may be able to convey information about the position and/or orientation of one, two, three, four or more frame members of the carrier and/or the image capturing device. The sensor data may be used to determine position and/or orientation of the image capturing device relative to the movable object and/or a reference frame.

The carrier sensors can provide position and/or orientation data that may be transmitted to one or more controllers (not shown) on the carrier or movable object. The sensor data can be used in a feedback-based control scheme. The control scheme can be used to control the driving of a plurality of actuator members such as two, three, four, five, or more motors. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload carried by the carrier. The carrier sensors may be situated on the carrier or the payload, as previously described herein. The control signals produced by the controllers can be received by a first actuator driver, a second actuator driver, and/or a third actuator driver. Based on the control signals, the first, second, and/or third actuator drivers may control the driving of the first, second, and/or third actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier can be coupled indirectly to the UAV via one or more damping elements. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the load, for example, via the fourth frame member 1428. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

Figure 12:
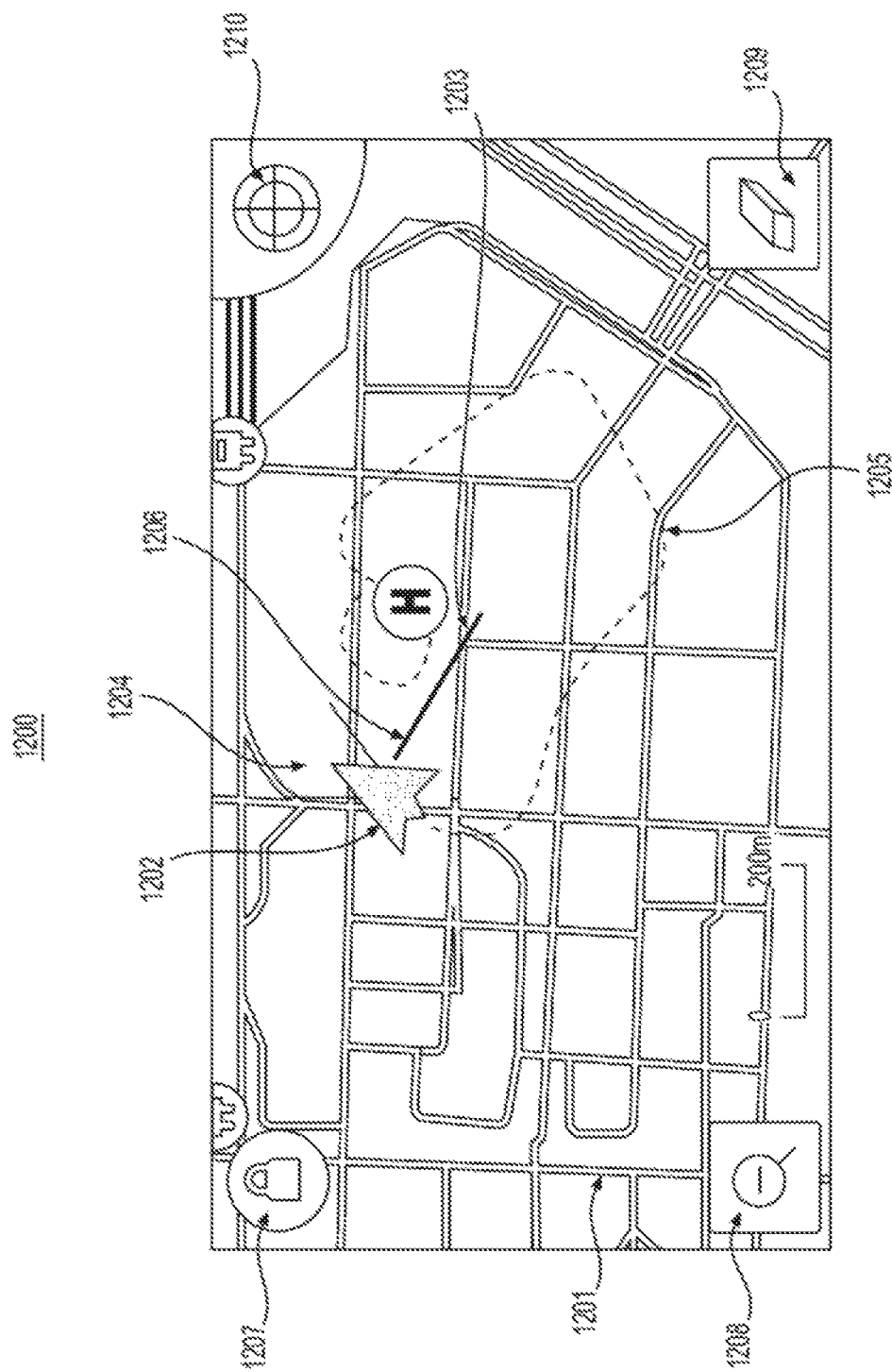
FIG. 12 illustrates an exemplary map section, in accordance with various embodiments of the present disclosure.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape, such as illustrated in FIG. 12. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements as illustrated in FIG. 12 may provide damping primarily along the Y (yaw) axis 1406. As such, the illustrated damping elements can be configured to reduce vertical motions.

Although embodiments herein may be depicted as utilizing a single type of damping elements (e.g., rubber balls), it shall be understood that any suitable combination of types of damping elements can be used. For example, the carrier may be coupled to the movable object using one, two, three, four, or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects (e.g., near the coupling members 1430 of the fourth frame member 1428). In some instances, the load can be embedded within or enclosed by one or more damping elements.

An Exemplary Unmanned Aircraft Vehicle (UAV)

Figure 5:
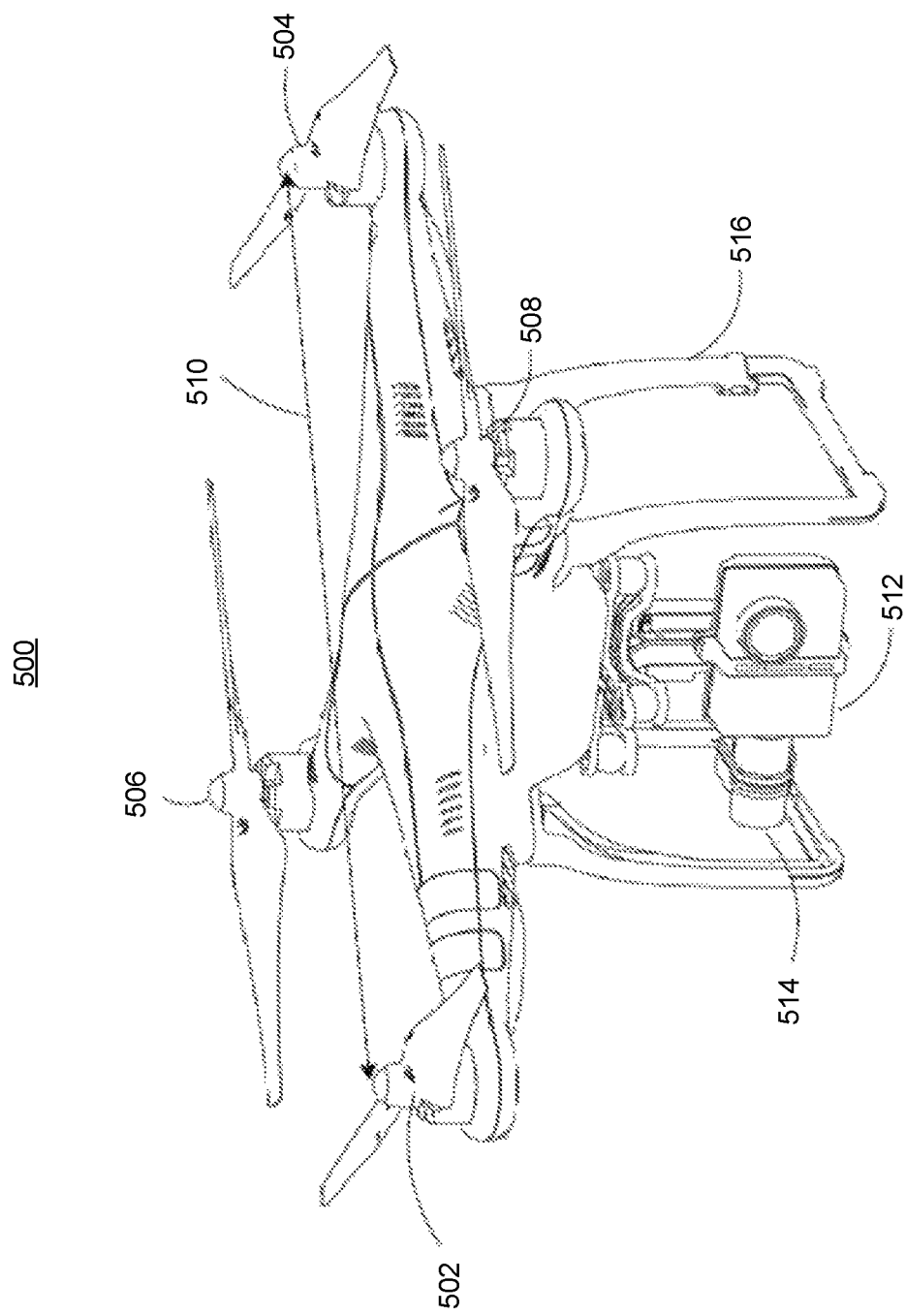
FIG. 5 is an exemplary illustration of an unmanned aircraft vehicle (UAV), in accordance with embodiments of the present disclosure.

FIG. 5 is an exemplary illustration of an unmanned aircraft vehicle (UAV), in accordance with embodiments of the present disclosure. The UAV may be an example of a movable object as described herein. The UAV 500 can include a propulsion system having four rotors 502, 504, 506, and 508. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 510. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be the same housing of the movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload 512. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier 514. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touch screen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may control the movable object, carrier, and/or payload, or a state of the movable object, carrier and/or payload, as well as receive and/or display information from the movable object, carrier and/or payload. For example, a terminal may control the position of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Movement Simulation

In accordance with various embodiments of the present disclosure, a realistic simulation of the movement of a movable object can share various components that are used for real operation of the movable object. For example, a realistic flight simulation can be a flight simulation that comprises components used in a real flight operation of a vehicle.

FIG. 6 shows various exemplary components of a realistic flight simulation environment, in accordance with various embodiments of the present disclosure. A realistic flight simulation environment 600 can comprise a UAV 604, a remote controller 601, a display device 602, and a connector 603 between the remote controller and the display device.

A UAV can be operated in different operation modes, such as a flight mode and a simulation mode. In a flight mode, the UAV can be flown in a real environment, e.g. by receiving instructions or input from a remote controller. For example, a real flight environment can be an outdoor, indoor environment, or mixed outdoor and indoor environment where a UAV can be operated. Operation of the UAV can be flight or other locomotion of the UAV. A real environment can exist in real time and space. A real environment may be tangible in a physical world.

In a simulation mode, the UAV may fly within a virtual environment without actually flying in a real environment. A virtual or simulated environment can be an environment that exists in a computer software structure. The virtual or simulated environment can be created from one or more inputs from a user, software developer, or information from a database. A virtual or simulated environment can be a representation of an environment that exists in real space and time or an imaginary environment that does not exist in real space and time. A virtual or simulated environment can comprise defined boundaries, obstacles, and surfaces. The virtual or simulated environment can have defined medium to support flight of the UAV, for example, the medium can be air. The medium can exist and be defined mathematically in the virtual environment. In some embodiments, the virtual environment does not exist in the physical, tangible world.

The UAV may remain physically dormant and may not be self-propelled within the real environment. One or more propulsion units of the UAV may not operate while the UAV is in the simulation mode. In the simulation operation mode, one or more components on-board the UAV can contribute to a flight simulation. In some cases, none of the components on-board the UAV 604 can be used in the flight simulation. In the simulation operation mode, a virtual UAV can be flown in a virtual or simulated environment. The virtual UAV and the virtual environment can exist mathematically in a simulated space. The virtual UAV can have the same functionality in the virtual environment as the real UAV in the real environment.

When the UAV is in a simulation mode, the input provided by the remote controller 601 can be flight control data. The flight control data can be an instruction that changes a flight path or causes a flight event to start or stop. In an example, the flight control data can be an instruction to start a propulsion system, stop a propulsion system, increase power to a propulsion system, decrease power to a propulsion system, change the heading of a UAV, change the elevation of the UAV, turn on a sensor on a UAV, turn off a sensor on a UAV, report sensor data from a sensor on-board the UAV, or initiate an autopilot function on the UAV. When the UAV is in a simulation mode, the flight control data may not be communicated to the propulsion units of the UAV.

The UAV can comprise a receiver configured to receive a mode signal that indicates that the UAV is in a flight mode or a simulation mode. The mode signal can be provided by the remote controller, the display device, or a separate device in communication with the receiver. In some cases, the signal can be provided through a hardware component on the UAV. The hardware component can be manipulated by a user to provide the signal to the UAV. For example, the hardware component can be a switch, button, or knob that can be physically displaced between a first and second position to provide a signal indicating a first or second mode. In another example, a flight mode can be a default mode and the UAV can operate in the flight mode unless a mode signal indicates a change to the simulation mode.

In some cases, one or more functions of the UAV can be controlled at least partially by an input from a user. The input from a user can be provided to the UAV through a remote controller. Providing input to control one or more functions of the UAV through a remote controller can be difficult. In some cases, a user that is unfamiliar with providing input to control one or more functions of the UAV through a remote controller may fail to achieve a desired result using a remote controller. Failure to achieve a desired result using a remote controller can result in damage to the UAV and/or loss of the UAV in an unknown environment. It can be advantageous to provide a simulation exercise in which a user can train and practice controlling a virtual UAV in a virtual environment using a remote controller. The remote controller may be the same remote controller used to fly a UAV in a real flight environment.

A remote controller that is configured to control a virtual UAV in a virtual environment (or simulation) can be the same or similar to a controller that is used to control a real UAV in a real environment. Providing the same controller for use in both the simulation and the real environment can result in a more realistic training experience for a user. A user can develop muscle memory associated with movement or manipulation of a physical interface on a remote control. Providing an identical remote controller in both a simulation and real flight mode of a UAV can provide the advantage of utilizing the muscle memory formed in the simulation mode for use in the real flight mode. Muscle memory can increase reaction time, precision, and accuracy in flight mode. Providing the same controller for use in both the simulation and flight mode of the UAV can familiarize a user with the sensitivity of the controls on the remote control. For example, a user can become familiar with the response time of the UAV to an input from the remote control. In another example, a user can become familiar with the magnitude of a response relative to movement of a physical interface on a remote control. Additionally, a user can memorized the location of knobs, buttons, joysticks, and/or dials on a remote controller in simulation mode, in flight mode the memorized location of these components can increase reaction time and therefore increase a user's ability to control the UAV.

The remote controller can be the same remote controller that is used to control a UAV in a real flight operation. In some cases the remote controller can be a similar or identical copy of a remote controller that is used to control a UAV in a real flight operation. The remote controller can have any combination of physical user interface mechanisms. A physical user interface mechanism can be a component on the remote controller that a user touches or manipulates to control at least one function of the UAV. In an example, a physical user interface mechanism can be a button, a joystick, a roller ball, a touch screen, a switch, a dial, or a knob. In some cases the physical user interface can comprise two or more joysticks. The joysticks may move vertically and horizontally. The joysticks may be used to control pitch, roll, yaw, and/or vertical velocity. The physical user interface mechanisms can be configured such that a user can control movement of the UAV about a roll, yaw, and/or pitch axis. The physical user interface mechanisms can be manipulated by a user to cause translation of a UAV in a direction along a plane in three-dimensional space. The physical user interface can be further configured to provide a user control over the flight of the UAV. Controlling flight of the UAV can include controlling speed, power, throttle, and/or elevation of the UAV. In some cases, the physical user interface can provide mechanisms to control non-flight actions of the UAV. A non-flight action can be movement of a sensor or payload on-board the UAV. The non-flight action may include actuation of a carrier of a UAV that may be configured to carry a payload. Another example of a non-flight action can be collection and/or reporting of data collected by a sensor on-board the UAV. Additionally, the physical user interface can provide mechanisms to initiate an autonomous action or task by the UAV. In an example, an autonomous task or action can be automatic return, pose-keeping flying, GPS flying, autonomous take off, or autonomous landing.

The UAV simulation may use a display device to depict a virtual simulated environment of the UAV. An application may run on a display device, such as a mobile device. The application may show a three-dimensional virtual environment and flight of the UAV within the environment. A flight control system may be used to control flight of the UAV within the virtual environment. The flight control system may be on-board the UAV, on-board the display device, or on any other device. The flight control system may use data from virtual sensors to generate a simulated flight. In some instances, a UAV may operate within a flight mode or a simulated mode. When in flight mode, the UAV flight control system may send signals to propulsion units of the UAV to effect flight of the UAV. When in simulated mode, the UAV flight control system may send signals to a physical model without sending signals to the propulsion units. The physical model may provide virtual feedback, which may help define the simulated flight of the UAV.

The display device can be a device that comprises a computing component and a visual display. The computing component can comprise one or more processors, one or more memory storage devices. The processors may be configured to execute instructions in accordance with non-transitory computer readable medium. The memory may comprise non-transitory computer readable media comprising code, logic, or instructions for performing one or more steps described herein. The display device can comprise a non-transitory computer readable media comprising program instructions for performing a flight simulation. The display device can be a mobile device, such as a smart phone. In some cases, the display device can be a desktop computer, laptop computer, tablet, or virtual reality headset. Alternatively, the display device can be the combination of a computing component and a visual display where a visual display can be a touch screen, projector, LCD screen, plasma screen, LED or OLED screen, a television, or a monitor. The display device can provide a visual and/or textual representation of flight data during a flight simulation. In some cases, the display device can additionally provide audio feedback during a flight simulation. The display device can be configured to receive user input through a user interactive component, such as a touch screen, switch, button, key, knob, mouse, pointer, trackball, joystick, touchpad, inertial sensors (e.g., accelerometers, gyroscopes, magnetometers) microphone, visual sensor, or infrared sensor. The user interactive component may receive touch inputs, positional inputs, audio inputs, or visual inputs.

In a simulation mode, the display device can receive simulated flight data from the flight control system on board the UAV. The simulated flight data can be transmitted to the display device directly from the flight controller on board the UAV or the data can be transmitted from the flight controller to the remote controller and then from the remote controller to the display device. The display device can comprise a non-transitory computer readable media comprising instructions for performing a flight simulation. The instructions for performing a flight simulation can be stored locally on a memory storage device in the display device or off-board the display device on another host device in communication with the display device. The display device can comprise a screen that may depict the simulation data in a 2D or 3D rendering. The display device can be a mobile phone (e.g. smart phone), tablet, desktop computer, laptop computer, virtual reality headset, or a television or projector in communication with a computer device. In some cases the display device can comprise a touch screen, an LCD screen, or a plasma screen.

In various embodiments, any data processing required for the display of flight information as discussed herein may be implemented by the display terminal itself, one or more devices separate from the display terminal, or any combination thereof. In an example, the display terminal can be a "dummy" or "thin" terminal that is only capable of displaying information and incapable of complex data processing. In this case, most if not all of the display data may be generated by other devices or systems as opposed to the display terminal. In another example, the display terminal can be capable of performing more data processing than dummy terminals. In such a case, most if not all of the display data may be generated by the display terminal itself. For example, the display terminal may be capable of running applications (e.g., mobile apps). In yet another example, the data processing may be split between the display terminal and some other system or device that is operatively connected to the display terminal. For example, display terminal may be configured to run a front end application that communicates with a back end application that runs on a remote server. In various embodiments, the actual allocation of the data processing may depend on the software/hardware characteristics of the display terminal and/or other devices or systems, the amount of processing, the load of the respective devices, and other factors.

The remote controller can be in communication with the display device. Communication between the remote controller and the display device can be provided through a wired or wireless connection. A wireless connection can be provided between the remote controller and the display device through an RF connection, IR connection, Wi-Fi network, a wireless local area network (WLAN), a cellular network, or any other available wireless network. Alternatively, a wired connection can be provided between the remote controller and the display device through a permanent wire connection, coaxial cable connection, Firewire connection, MIDI connection, eSTATA connection, an Ethernet connection, or any other available wired connection that permits data transmission. In some cases, the wired connection can be a connection through a USB cable.

The display device can communicate with the remote controller though a wired or wireless connection. In some cases a wired connection can be a USB connection. The remote controller can receive simulated flight data from the flight control system on board the UAV. The simulated flight data can be modified by the remote controller before it is communicated to the display device. In some cases, the simulated flight data may not be modified by the remote controller prior to being communicated to the display device. In some cases, a flight simulation can be operated without connection to a flight control system on-board the UAV. The flight simulation can be executed with a connection between a remote controller and a display device. The display device can receive instructions directly from the remote controller and the display device can generate a flight simulation without communicating with the flight controller on-board the UAV.

In some embodiments, a display device can be configured to receive simulated flight data directly from a flight control system on-board a UAV. The display device may only receive simulated flight data from the flight control system when the UAV is in simulation mode. The display device can be in communication with the flight control system on-board the UAV through a wired or wireless connection. The flight control system can transmit simulated flight state information to the display device. The UAV can also be configured to communicate with a remote controller configured to control flight of the UAV in flight mode or simulation mode. The same controller can be used to control the UAV in both flight mode and simulation mode. The flight control data communicated to the UAV can be transmitted to the one or more propulsion units on board the UAV in flight mode. In a simulation mode, the flight control data communicated to the UAV can be transmitted to the physical model to generate simulated flight data. Simulated flight data can be generated by the flight control system from flight control data from the remote controller, virtual sensor data from one or more virtual sensors, and one or more outputs from the physical model on-board the UAV. The display device can display simulated flight state information of the UAV in response to the simulated flight data received from the flight control system.

The remote controller and the display device can be in separate communication with a flight control system or flight controller, through different wired or wireless connections. The flight control system can be on-board or off-board a UAV. In some cases, the flight control system can be on-board the display device. The flight control system can be configured to generate flight control data in response to an input from the controller and/or the display device. The flight control system can receive input from a user through the remote controller and/or the display device. The flight control system can communicate the input to a system of one or more components that can generate real or virtual sensor data and communicate this data back to the flight control system. Based on the real or virtual sensor data, the flight control system can generate flight data and transmit the flight data to one or both of the remote controller and the display device. The process of generating real or virtual sensor data and the distinction between real and virtual sensor data will be described in detail below.

Physical Model

In accordance with various embodiments of the present disclosure, a physical model can be provided for a specific movable object, such as a specific UAV or a specific model of a UAV. In some cases, the physical model can provide parameters corresponding to a default movable object, such as a default UAV make and/or model. In some cases, the physical model can be on-board a movable object, such as a UAV. The physical model can be programmed to provide physical parameters corresponding to the movable object, such as the UAV, on which it is on-board.

Figure 7:
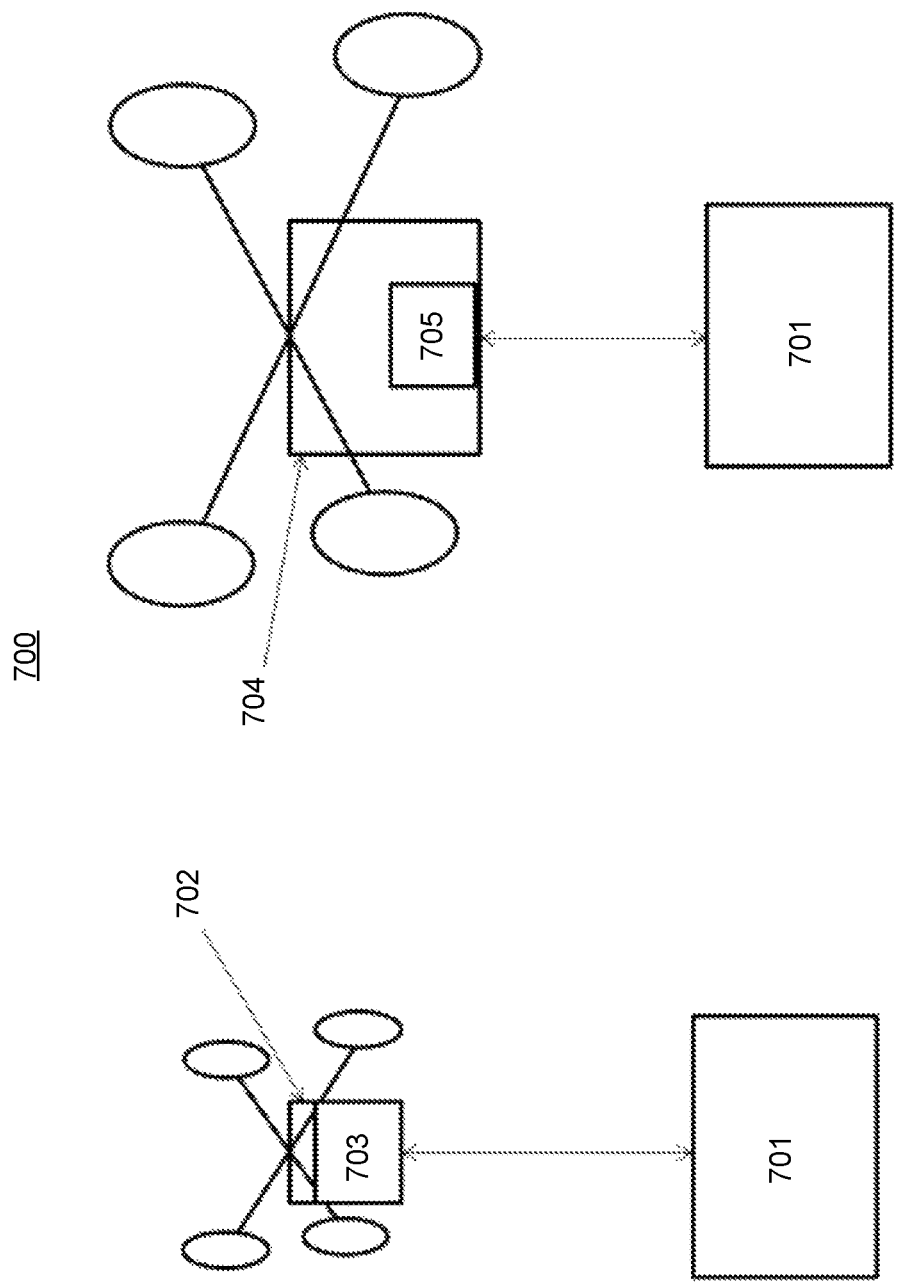
FIG. 7 shows a realistic flight simulation system interacting with different physical models, in accordance with various embodiments of the present disclosure.

FIG. 7 shows a realistic flight simulation system interacting with different physical models, in accordance with various embodiments of the present disclosure. As shown in FIG. 7, a controller 701 can connect to a first UAV 702 or second UAV 704. A physical model 703 can be provided for a UAV 702 and a physical model 705 can be provided for a UAV 704.

The establishing of a connection to a particular UAV by a controller can result in a connection to a different physical model with fixed variables corresponding to the particular UAV.

The controller 701 can take advantage of the physical model 703 for the first UAV 702, as the controller 701 establish a connection to the first UAV 702. The controller 701 can be in communication with a first UAV 702 that can be in communication with a first physical model 703. The first physical model 703 can be configured to simulate flight data outputs using fixed parameters corresponding to the first UAV 702. For example, the first physical model can be configured to use the weight, dimension, aerodynamic shape, motor strength, motor speed, and other power properties corresponding to the first UAV 702 in a mathematical model to determine one or more outputs.

Also, the controller 701 can take advantage of the physical model 705 for the first UAV 705, as soon as the controller 701 establish a connection to the first UAV 704. In this case, the same controller 701 can be in communication with a second physical model 705 on board a second UAV 704. The second UAV 704 can have a relatively different size, shape, weight, and/or power system compared to the first UAV 702. The controller 701 can be in communication with the second UAV 704 comprising that can be in communication with the second physical model 705. The second physical model 705 can be configured to simulate flight data outputs using fixed parameters corresponding to the second UAV 704. For example, the second physical model 705 can be configured to use the weight, dimension, aerodynamic shape, motor strength, motor speed, and other power properties corresponding to the second UAV in a mathematical model to determine one or more outputs.

In an alternate embodiment, the physical model can be off-board the UAV. The physical model can be on-board a display device. When the physical model is on-board a display device a user can choose to run a simulation using a UAV of a specified make and/or model. The physical model can have fixed physical parameters corresponding to one or more possible makes and/or models of a UAV saved on a memory storage device on or off-board the display device. A user can choose to use the saved fixed physical parameters corresponding to the one or more possible makes and/or models of UAV saved on the memory storage device or a user can input the fixed physical parameters directly into the physical model.

The physical model can be configured to generate as an output the expected response of a flight control input on the UAV. The output can be specific to a UAV with fixed physical parameters (e.g. dimension, weight, aerodynamic cross section, and/or motor specifications). The expected response to a flight control input can be dependent on the physical parameters of the UAV. For example, a heavier UAV can accelerate slower than a relatively lighter UAV. Similarly, a UAV with a stronger (e.g. higher torque) motor can accelerate faster than a UAV with a relatively weaker motor.

Additionally, the physical model can calculate non-flight parameters. In an example, a non-flight parameter can be battery usage rate and remaining battery life. The battery usage can be calculated as a function of the UAV specifications (e.g. dimension, weight, aerodynamic cross section, and/or motor specifications), the flight control data, and the variable parameters in the simulated environment. The variable parameters can influence the power requirements of the UAV and therefore influence the battery usage rate. For example, a simulated environment with a strong headwind can drain the battery than a simulated environment without a headwind or with a tail wind. Similarly, the flight control data can influence the battery usage rate. For example, operating the UAV at a relatively higher speed can drain the battery faster than operating the UAV at a relatively lower speed. Another example of a non-flight parameter that can be calculated by the physical model is wearing of parts on-board the UAV. The physical model can calculate forces that act on the UAV in the simulated environment and determine when a part or parts experience damage as a result of the forces.

The physical model can provide one or more outputs to a virtual sensor. The virtual sensor can be configured to generate virtual sensor data based on one or more outputs from the physical model simulation data. At least a fraction of the virtual sensor output can mimic data that would be generated by real sensors on-board the UAV during a flight mode operation of the UAV in a real environment. A virtual sensor can generate location data. Location data can be one or more distances between the UAV and obstacles or surfaces in the simulated environment. In a flight mode operation location data can be generated by a radar signal, sonar signal, or a global positioning software (GPS) signal. A virtual sensor can also generate visual data. In a flight mode visual data can come from a vision sensor. A vision sensor can be a monocular camera, stereo vision camera, radar, sonar, or an infrared camera. A virtual sensor can generate data that describes movement of the UAV and/or forces acting on the UAV. In a flight mode a real sensor configured to detect movement of the UAV and/or forces acting on the UAV could be a gyroscope, magnetometer, and/or an accelerometer.

The sensor data can be provided to a processing unit. The processing unit can be on-board the UAV. The processing unit can be configured to interpret the sensor data to determine and generate flight state information using the sensor data. The processing unit can interpret sensor data from virtual or real sensors when the UAV is in simulation or flight mode, respectively. The processing unit can interpret and/or process the sensor data from the real or virtual sensors to generate flight state information. Flight state information can include attitude, acceleration, speed, gyroscopic information, pressure, spatial disposition of the UAV, location (e.g. GPS data) data. The processing unit can provide the flight state information to the flight state control system.

A Simulated Movement

In accordance with various embodiments of the present disclosure, a user can operate a movable object in a virtual place, such as performing a simulated movement with the aid of a movement simulator for the movable object.

Figure 8:
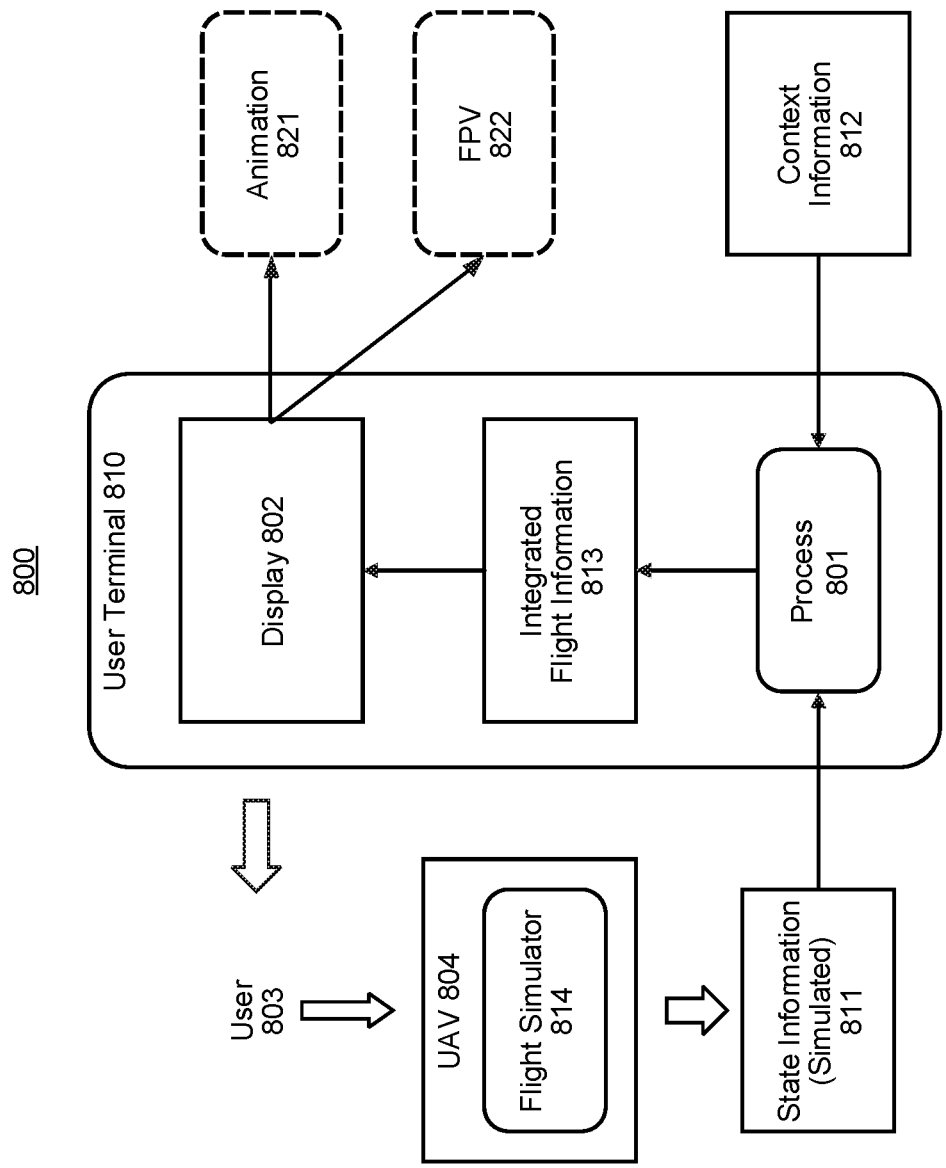
FIG. 8 is an exemplary illustration of supporting a simulated flight, in accordance with various embodiments of the present disclosure.

FIG. 8 is an exemplary illustration of supporting a simulated flight, in accordance with various embodiments of the present disclosure. As shown in FIG. 8, a user 803 can perform a simulated flight using a UAV 804. For example, the user 803 can take advantage of a user terminal 810, which can include a process 801 and a display 802. The process 801 may be used by an application, such as an app running on iOS or Android operating system.

During the simulated flight, a flight simulator (or a flight control system) associated with the UAV 804 can receive flight control signal(s). For example, the flight simulator can be on-board the UAV or on-board the display device. Furthermore, the flight simulator for the different types of UAVs may employ different physical models.

The flight control signal can be transmitted from a remote controller. The remote controller can be operated by a user in real time or the remote controller can receive inputs from a processor pre-programmed by a user to provide a series of flight control signals in response to a start command. The flight control signal can be an instruction to perform a discrete task or action. In an example a discrete task or action can be to increase or decrease speed by a fixed amount or percentage, to turn in a specified direction a specified number of degrees, or to increase or decrease altitude a fixed amount or percentage. In some cases, a flight control signal can include a command for a predetermined flight sequence. In an example a predetermined flight sequence can be an auto pilot function (e.g. auto take off, auto landing, or auto pilot flight for a specified distance), execution of pre-programmed mission, an auto-return of the UAV to a starting point of the flight of the UAV, autonomous hovering of the UAV, and/or pose-keeping flying of the UAV. A pre-programmed mission can include flight to a specific location or locations with or without operation of on-board sensors to collect and/or transmit data from the one or more locations. The flight control system can generate simulation flight data for or pertaining to execution of the discrete task or action or the predetermined flight sequence.

As shown in FIG. 8, a process 801 in a user terminal 810 can receive various types of information, such as the simulated UAV state information 811, from a UAV 804. The simulated UAV state information 811 can include relative coordinate information, such as the Cartesian coordinates of the UAV 804 in the virtual space with the departure point as the origin point.

Additionally, the process 801 can obtain various types of context information 812, such as the location information collected and/or received by the user terminal 810.

Besides data directly or indirectly provided by the UAV 804 (or a component thereof), the user terminal 810 may also be configured to receive data from other sources such as control terminals, servers or online services, data stores, satellites, or any other suitable devices or systems. For example, such data may include positional information of control terminals. Such data, along with the UAV data, can be displayed on the display 802 with or without further processing.

The process 801 can determine the integrated flight information 813 based on the received simulated state information 811 and the context information 812. Also, the process 801 can provide the integrated flight information 813 to a display 802 of the user terminal 810.

The received state information about the simulated flight may contain relative coordinate information of the UAV. The coordinate information of the UAV can be location information that is relative to a take-off point of the UAV in the simulated flight. Also, the context information obtained by the user terminal can be location information, which may include longitude and latitude information of the take-off point of the UAV in the simulated flight.

Furthermore, the process 801 can determine a flight path of the UAV in the simulated flight based on the received coordinate information of the UAV and the location information of the user terminal. For example, the location information may include the longitude and latitude information of the user terminal, which is used as the take-off point of the UAV in the simulated flight. Also, the process 801 can determine the altitude information based on the available geographic information, such as a predetermined terrain model, which may be stored in the user terminal or received from a remote server. Then, a flight path of the UAV in the simulated flight can be displayed on a map section of the display 802 of the user terminal 810.

For example, the display terminal may be configured to display the relative positions of the UAV and a remote control terminal based on positional information from both the UAV and the remote control terminal. As another example, the display may be configured to display the real-time position of the UAV on a map based on the processing of both map data and position data of the UAV. The map may be generated based on the map data received from a remote data server, data stores, and the like. The real-time position of the UAV may be received from the UAV, a remote server, a remote sensor system, and the like.

For a movable object in a simulated movement, the coordinate information of the movable object can be location information that is relative to an originating point of a movable object in a simulated movement. Also, the context information obtained by the user terminal can be location information, which may include longitude and latitude information of the originating point of a movable object in a simulated movement.

Furthermore, the process 801 can determine a movement path of the movable object in the simulated movement based on the received coordinate information of the movable object and the location information of the user terminal. For example, the location information may include the longitude and latitude information of the user terminal, which is used as the originating point of a movable object in a simulated movement. Also, the process 801 can determine the altitude information based on the available geographic information, such as a predetermined terrain model, which may be stored in the user terminal or received from a remote server. Then, a movement path of the movable object in the simulated flight can be displayed on a map section of the display 802 of the user terminal 810.

For example, the display terminal may be configured to display the relative positions of the movable object and a remote control terminal based on positional information from both the movable object and the remote control terminal. As another example, the display may be configured to display the real-time position of the movable object on a map based on the processing of both map data and position data of the movable object. The map may be generated based on the map data received from a remote data server, data stores, and the like. The real-time position of the movable object may be received from the movable object, a remote server, a remote sensor system, and the like.

Additionally, the process 801 can determine location information of the UAV in the simulated flight based on a priority list. For example, the priority list may include information received from the UAV, a remote control, and an application on the user terminal. The process 801 can determine the location of the UAV in the virtual space based on the location information received from the remote control if the location information received from the UAV is not applicable or usable. Also, the process 801 can determine the location of the UAV in the virtual space based on the location information received from the application if the location information received from the remote control is not reliable or accurate. Otherwise, the process 801 can use determine the location of the UAV in the virtual space based on a default location, e.g. when the system cannot receive GPS signals.

The simulated flight data can be displayed on a visual display 802 or user interface of the display device. The visual display can be an image of a UAV in a simulated environment. The UAV can be articulated in the display in real time corresponding to flight data provided by the flight simulator or controller. The display can be an image or an animation of the simulated environment in a 3D rendering of the environment. The simulated flight data can be displayed in the form of simulated flight state information. Simulated flight state information can include the location of the UAV in an environment, proximity to features in the environment, velocity of the UAV, acceleration of the UAV, directional heading of the UAV, and/or health of one or more systems on the UAV.

In a simulated flight, the user 803 can control the UAV 804 to fly in the virtual space, based on the displayed flight information and animations. For example, the user 803 can use a remote control to send a few control signals to instruct the UAV 804 to make moves.

After receiving the control signal at the UAV 804, the flight simulator (e.g. on-board of the UAV 804) can generate simulated flight status information 811. Furthermore, the simulated flight state information 811 can be directed to the process 801 in the user terminal 810, which can determine the updated flight information 813 and provide the updated flight information 813 for displaying.

In some cases, a UAV 804 can be configured to perform autonomous tasks in a simulated flight. An autonomous task can be initiated by a user. After an autonomous task is initiated by a user, a UAV may not require additional control or input from a user while the autonomous task is performed. An autonomous task may cause a UAV to enter a predetermined sequence. The predetermined sequence may include a series of actions that do not require user input. In an example, an autonomous task can be automatic return, pose-keeping flying, GPS flying, autonomous take off, or autonomous landing. In the simulation system provided herein a user can practice instructing a UAV to perform an autonomous task. The instruction to perform an autonomous task can be provided to the UAV in simulation mode though an identical interface as the interface used in flight mode. The interface can be a remote control.

An auto pilot function can be an auto take-off or landing in a simulated flight. An autonomous take off can comprise turning on one or more propulsions units and generating a lift force sufficient to leave a surface. Autonomous take off can additionally include adjusting rotation and translation of the UAV to maintain stability. Once the UAV reaches a specified altitude above a take-off surface and achieves stability the UAV can exit the autopilot function and a user can control the UAV. Similarly during an auto landing a UAV can approach a surface while maintaining stability and turn off the one or more propulsion units after landing on a surface. During pose-keeping flight a UAV may fly in a specified direction while maintaining a specified distance from a surface or obstacle.

The display of a simulated flight can include displaying at least some of the received information that may or may not have been processed. In various embodiments, the displayed information may be generally include or related to a UAV, a payload carried by the UAV, images or other sensing data captured by the payload and/or the UAV, a remote terminal (e.g., control terminal for the UAV and/or payload), environment surrounding the UAV, and/or any combinations thereof.

For instance, various types of the information discussed herein may be displayed simultaneously on the same screen or the same user interface so as to give the user a comprehensive view of all pertinent information. In an example, the UAV state information and the payload state information may be displayed simultaneously on the same screen of the display terminal. In another example, the UAV state information and/or payload state information may be displayed together with information (e.g., position and/or attitude) about a remote terminal (e.g., control terminal) so as to provide an intuitive illustration of the relative relationship between the objects. As yet another example, the UAV state information, payload state information, and/or the remote terminal information can be displayed simultaneously with real-time images captured by the payload and/or other sensing data about the UAV so as to allow the user to intuitively control the navigation of the UAV and/or orientation of the payload (e.g., via control of the carrier). As another example, a map showing both the position of the UAV and a field of view (FOV) of the payload may be provided enabling a user to easily determine the range of landscape that can be captured by images of the payload.

In some embodiments, regions for displaying the various types of the information discussed herein may or may not overlap to improve screen efficiency. The overlapping regions may be provided as transparent, semi-transparent, or opaque layers. For instance, the regions for displaying UAV state information and payload state information may overlap such that an area can be used to display both kinds of information. As another example, the UAV and/or payload state information can be displayed in a layer that is superimposed on top of images captured by the payload.

In some embodiments, the display can be customized based on user preferences and/or user inputs. For example, the user may provide one or more parameters defining the content and/or the layout of the information to be displayed. For example, the user may specify the amount, type, unit or metric system, and other relevant parameters regarding the information to be displayed. As another example, the user may specify the font, color, size, shape, position, format, layout of the user interface (UI) components used to display the information. In some embodiments, the user interface used to display information may also be used for a user to provide information. Such information may be used to control aspects of the UAV, payload, and the like.

At least some of the steps described above can be implemented in real or nearly real time. For example, state information about the UAV and/or payload, images captured by the payload, sensing data, and/or other information may be received in real or nearly real time as such information is generated in a simulated flight. Likewise, the received information may be processed in real or nearly real time as it is received. The display of the received information may occur in real or nearly real time. Finally, the display may be updated in real or nearly real time as to reflect updated information is received. Alternatively, there may be some delay in some or all of the steps above. In various embodiments, some or all of above steps may be implemented either when the UAV is airborne or when the UAV is not airborne.

Additionally, in order to provide a realistic display of a simulated flight, the system can take advantage of various display features that are used in real flight mode.

More details of the display features are disclosed in International Application No. PCT/CN2014/089605, entitled "UAV FLIGHT DISPLAY," filed on Oct. 27, 2014, the contents of which applications are hereby incorporated by reference in their entirety.

In general, any step of any process discussed herein for implementing UAV flight display can be implemented, individually or collective, by one, two, three, four, or more devices or systems. Such devices or systems can include a display terminal, a remote control terminal, a server, a cloud-based system, or any other suitable devices or systems. In an example, all of the steps above may be implemented by the same device or system. Data used to for UAV flight display may be received by one, two, three, or more devices and/or systems. Data processing required for UAV flight display may be performed by one, two, three, or more devices and/or systems that may or may not overlap with the devices and/or systems used to receive the data. Finally, the display of the UAV flight data may be performed by one, two, three, or more devices and/or systems that may or may not overlap with the devices and/or systems used to receive and/or process data. As an example, the state information of the UAV and/or the payload may be received by a first device, the information may be processed by a second device, and the processed information may be displayed by a third device.

An Exemplary User Interface (UI) for Displaying a Simulated Flight

In accordance with various embodiments of the present disclosure, the information related to a simulated flight may be displayed in a user interface in an intuitive and efficient manner. For instance, the remote display terminal may include a display that is separated from, or be integral to, a remote control terminal. The remote display terminal may be the same as or a part of the remote control terminal.

Figure 9:
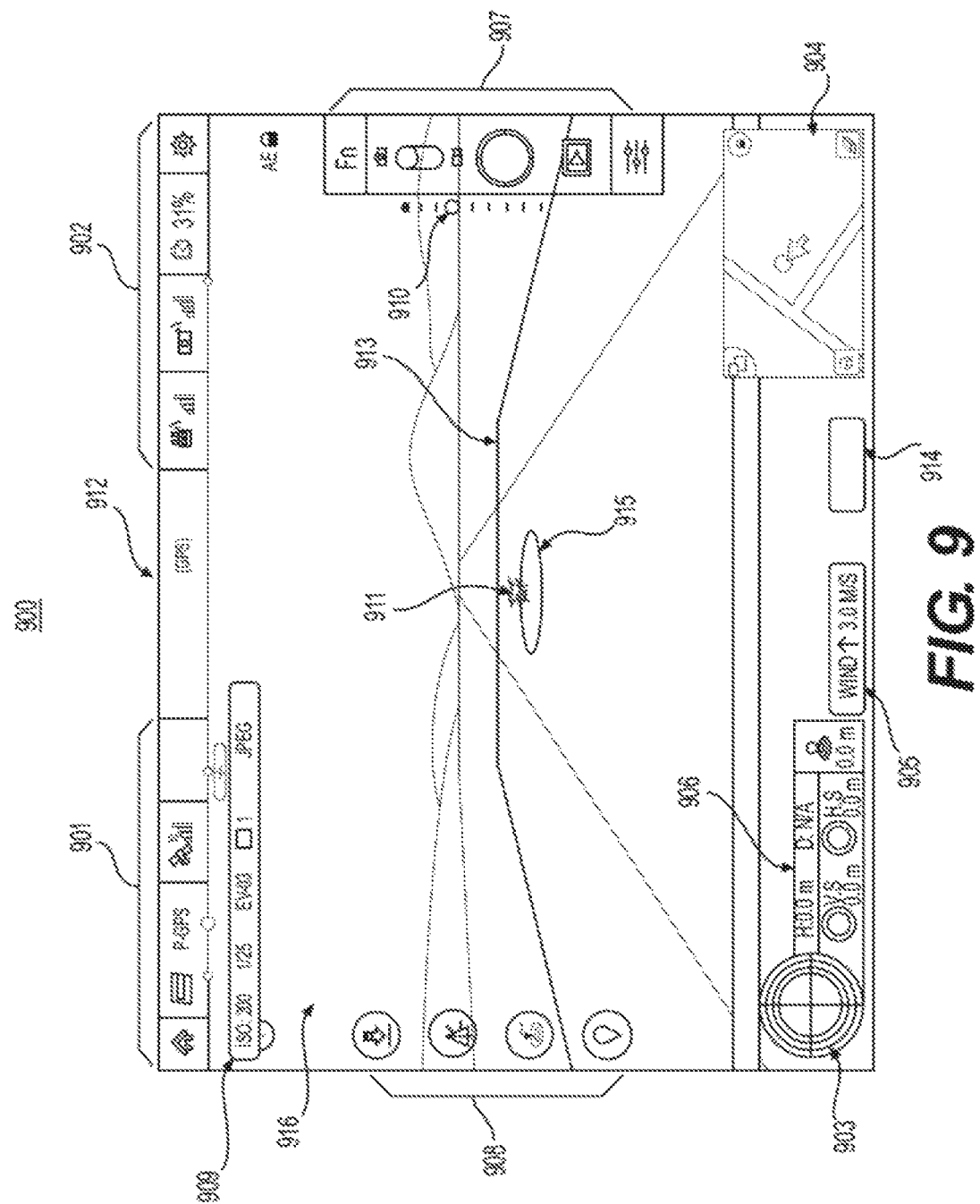
FIG. 9 illustrates an exemplary user interface (UI) for displaying a simulated flight before a UAV is taken-off, in accordance with various embodiments of the present disclosure.

FIG. 9 illustrates an exemplary user interface (UI) for displaying a simulated flight before a UAV is taken-off, in accordance with various embodiments of the present disclosure. As shown in FIG. 9, the UI 900 may comprise one or more primary display areas or sections 916 and one or more secondary display areas or sections 901-910.

The primary display area 916 may be configured to have a larger display area (e.g., more pixel counts) than any one of the secondary display sections. In some embodiments, the type of information displayed in the primary and/or secondary display areas is fixed.

In some other embodiments, the type of information displayed in the primary and/or secondary display areas can be dynamically swapped or toggled. For instance, information displayed in the primary display area 916 can be dynamically swapped with information displayed in a secondary display area. In various embodiments, the user may toggle or swap the display via any suitable input mechanisms such as touchscreen, mouse, keyboard, voice command, and the like. In some embodiments, information displayed in one primary display area can be dynamically swapped with information displayed in another primary display area. Information displayed in one secondary display area can be dynamically swapped with information displayed in another secondary display area.

As shown in FIG. 9, the primary display area 916 in the UI 900 can be used to display a UAV 911 (e.g. using an icon, an image, or an animation) in a simulated flight. For example, the graphical display in the primary display area 916 can show an animation with the UAV 911 at the originating point 915 in a parking apron 913. The view point for the animation can be an arbitrary location or a preconfigured location (e.g. a point twelve meters south of the originating point 915 and two meters higher).

As the UAV 911 is taking off in the simulated flight, the flight simulator (e.g. on-board of the UAV 911) can generate simulated coordinator information for the UAV 911 in the simulated flight, e.g. with the originating point 915 as the original point of the coordinator system. Correspondingly, the UI 900 can display the movement of the UAV 911 in the simulated flight in the animation.

Also, the primary display area 916 in the UI 900 can be used for displaying image data captured by a payload coupled to the UAV such as still pictures or videos, whereas the secondary display areas can be configured to display information related to a UAV and/or for receiving user input. Alternatively, the primary display area 916 in the UI 900 can be used for displaying fictional or predetermined image or video data that is provided for a payload coupled to the UAV. For example, in a first-person view (FPV) mode, the system can display fictional or predetermined view corresponding to a particular geographic location, e.g. based on a predetermined terrain model along a flight path.

In various embodiments, the FOV and/or the line of sight of the payload may or may not be aligned with the direction the UAV is heading. For example, the FOV and/or line of sight of the payload may be at an angle with the UAV's heading along a yaw, pitch and/or roll axis. The angle may be greater than 0 degree, 30 degrees, 60 degrees, 90 degrees, 120 degrees, 150 degrees, 180 degrees, 210 degrees, 240 degrees, 300 degrees, and the like.

In some embodiments, the UI 900 may provide one or more control sections 907 and 908 for controlling a UAV and associated payloads in a simulated flight. For example, the user may be allowed to interact with some or all of regions of the UI 900 via one or more input mechanisms such as touchscreen, mouse, keyboard, joysticks, stylus, wearable devices, visual or audio commands, and the like. The user input provided via the UI 900 may be used to control aspects of the display and/or display terminal, the UAV, the payload, the remote terminal, sensors, and the like.

The UI 900 can also include one or more control sections 907 and 908, each including controls for selecting, activating, deactivating, modifying, or otherwise controlling one or more modes, operations, or routines of the UAV and/or components thereof. In some embodiments, control data generated based on selection of the controls can be transmitted directly or indirectly to the UAV so as to control one or more aspects of the UAV and/or the payload. At least some of the controls can be represented by graphical icons illustrative of the modes or operations associated with the controls. The graphical icons can be designed to facilitate intuitive understanding of the function of the controls without the help of any textual description. Furthermore, such "one-touch" or "one-click" control interface can simplify the process for a user to provide control, such as for selecting, activating, deactivating or otherwise controlling aspects of the UAV and/or payload. For instance, the user can use such "one-touch" or "one-click" controls to activate a predetermined and/or autonomous routine such as auto-return, autonomous takeoff, autonomous landing, hovering, and the like.

In some embodiments, the UI 900 can be used to allow a user to remotely control the payload onboard the UAV such as when the UAV is airborne in a simulated flight. For instance, the control section 907 can include one or more controls for selecting a mode of the payload such as an image capturing device. The control section 907 can also include a plurality of payload configuration controls, for setting various configuration or operational parameters of the payload (e.g., image capturing device such as a camera).

In some embodiments, the UI 900 described herein can be used by a user to control aspects of one or more autonomous tasks that can be performed by the UAV, payload, or a component thereof. An autonomous task can be initiated by a user. After an autonomous task is initiated by a user a UAV may not require additional control or input from a user while the autonomous task is performed. An autonomous task may cause a UAV to enter a predetermined sequence. The predetermined sequence may include a series of actions that do not require user input.

The control section 908 can include one or more controls for controlling other aspects of the UAV and/or payload. For example, the takeoff/landing control can be used to activate or deactivate the execution of an autonomous takeoff and/or landing routine by the UAV. The autonomous takeoff and/or landing routine, when initiated, can cause the UAV to engage in a sequence of predetermined actions (e.g., involving its propulsion system, sensors, flight control system, and the like) so as to takeoff and/or land without any or with minimal human intervention. The carrier mode control can be used to specify a mode for controlling a carrier. The carrier couples a payload to the UAV and may permit the payload to move relative to the UAV. The carrier mode can be selected from a plurality of modes including head-following mode, first-person view (FPV) mode, free control mode, one key return mode, gesture control mode, fine-tune roll control mode, and the like.

The control section 908 can also include an auto return control that allows a user to activate and/or deactivate an auto return routine, for example, with a single click or selection of the auto return control. The auto return routine, when initiated, can cause the UAV to engage in a sequence of predetermined actions (e.g., involving its propulsion system, sensors, flight control system, and the like) so as to return autonomously to a predetermined home point without any or with minimal human intervention. The home point can be the takeoff point for the UAV or any arbitrary point with known (or determined) location. The home point may be specified by a user or provided by default. In some embodiments, the home point for the auto return routine may be set via the home setting control. The home setting control may provide options for the user to set the home point.

Additionally, the UI 900 can include a reset or restart button 914 that allows a user to stop and restart the simulated flight. The simulated flight can be restarted from the beginning, e.g. before the UAV taking off. Also, a section of the simulated flight can be restarted, i.e. the simulated flight can be restarted from a way point along the flight path. For example, a use can take advantage of the reset or restart button 914 to repeat practicing a part of a simulated flight. Alternatively, the UI 900 can force a user to reset or restart a simulated flight, e.g. when training a novice pilot.

The UI 900 can also include one or more information display sections 901-902. The display sections 901-902 can be configured to display various status information of a UAV in a simulated flight, such as the information related to power supply, communication, data storage capacity, navigation state, sensor state, and the like.

The display section 902 can include one or more status indicators of various communication channels with the UAV. For example, the status of an uplink or control channel (communication channel or link used for the transmission of remote control signals from a remote controller) can be represented by a controller icon along with a bar chart, a number (e.g., from 0 to 100), or any other suitable indicator of a status or condition of the control channel. The status of a downlink or data channel (communication channel or link used for the transmission of data such as image data from the UAV) can be represented by a data transmission icon along with a bar chart, a number (e.g., from 0 to 100), or any other suitable indicator of status and/or condition of the data channel. The status or condition of the control and data channels may indicate the signal strength, noise, interference, signal-to-noise ratio (SNR), bit error rate, fading rate, and other characteristics of the communication channels.

The display section 902 can also include one or more indicators of power supply for the UAV, or a component thereof. Such indicators may include a battery icon along with a numeric indicator of the remaining battery power. Additionally or alternatively, the power supply indicators can also include a scrollbar indicator. The scrollbar can include a plurality of segments each indicating a corresponding state related to the battery power. In one embodiment, each segment of the scrollbar corresponds to a particular range of percentage of battery power. In some embodiments, the multiple segments can be visually distinguishable from each other such as by color, pattern, position, or any combination thereof. The position of the scroll pointer on the scrollbar can correspond to the current level of available battery power. Advantageously, the multi-segmented scrollbar allows a user to easily and intuitively identify the proximate level of battery power (e.g., whether it is very low, low, medium, or high) without having to know the exact percentage.

The scrollbar may not only represent the percentage of battery power, but also provide a "smarter" or more useful representation of the battery power—the ability of the UAV to reach a particular destination or distance—in a precise and real-time fashion, so that the user does not have to do the calculation or estimation herself, which could be slow and/or inaccurate. Such battery indicator allows a user to make quicker decisions which in turn ensures better flight safety for the UAV.

The power supply indicators can also include a time indicator that shows an approximate flight time in a simulated flight. The flight time can represent the time of flight using the remaining power supply in the simulated flight. The flight time can represent the amount of time before the UAV need to start returning to a particular destination (e.g., home point) to ensure that the destination can be reached safely. The flight time can also represent the amount of time before the UAV need to land to ensure safety. The flight time can also represent the amount of time before an automated routine (e.g., auto landing or auto return) is initiated. Advantageously, the time indicator provides important flight status information (e.g., remaining flight time) derived based on the battery status so as to enable the user to take quick actions.

The display section 902 can also include a setting control that may be used by a user to provide and configure general settings. Selection of the setting control can cause display of additional controls used for controlling additional aspects or for displaying additional information. For example, the additional controls may be used to reformat a storage medium (e.g., SD card), restore default settings, display version information, and the like associated with the UAV, payload, remote terminal, or the like.

The display section 901 can include a GPS indicator comprising a satellite icon and a bar chart indicating the strength of the GPS signals. The GPS indicators may alternatively or additionally include a number (e.g., 12) of satellites in view.

The display section 901 can also include a navigation mode indicator. For example, the navigation mode indicator can be used to indicate that the navigation is based on GPS, vision, or both. In various embodiments, the navigation may be performed based on sensing systems other than GPS and vision, such as inertial measurement unit (IMU), proximity sensors (e.g., lidar, infrared, ultrasound), and the like. The navigation mode can be selected to be based on any suitable sensing system or any combinations thereof. The navigation mode can be determined automatically by a process running on the UAV (e.g., by a flight control module), selected remotely by a remote user via a remote control terminal, or a combination thereof. The allocation of control between the user and the UAV can be changed dynamically based on the environment of the UAV. For example, more UAV autonomy and less user intervention may be required when the UAV is within a relatively simple environment (e.g., in an outdoor and/or open space). Conversely, more UAV autonomy and less user intervention may be required when the UAV is within a relatively complex environment (e.g., in an indoor and/or closed space).

In some embodiments, selection of the navigation mode indicator can cause additional controls to be displayed for configuring various parameters associated with a navigation mode. Such additional controls may be used to set maximum altitude, minimum altitude, maximum distance, and the like.

The display section 901 can also include an intelligent orientation control (IOC) indicator for controlling the heading of the UAV. The display section 901 can also include one or more storage indicators indicating a current data storage capacity of the payload and/or the UAV. The display section 901 can also include a back control that can be used to back out the current user interface and return to the interface for a previous menu control/item, similar to the functionality of a browser back button.

The UI 900 can include a flight display section, such as an icon display section 903 (or attitude sphere) and a flight parameters display section 906. The flight display section can be used for displaying position, attitude, speed, and other flight information related to the UAV. In particular, the flight display section can be configured to simultaneously display both UAV state information and payload state information.

Also, the UI 900 can include a map section 904 that can be used to display the current position and/or orientation of the UAV on a map (e.g., satellite map). The map can be further configured to indicate the current position and/or orientation of a remote control terminal, a home point, a flight path of the UAV, and the like. Additionally, the map can be configured to indicate the orientation and/or angle of a FOV of an image sensor on the UAV. In some embodiments, the map section 904 can be displayed as an inset of the image section 916 in a picture-in-picture fashion. In other embodiments, the map section 904 may not overlap the image section 916.

Additionally, the UI 900 can include other information sections such as a wind indicator 905, a payload pitch indicator 910 and various payload configuration controls 909. The wind indicator 905 can display the simulated speed and direction of the wind in the field (i.e. the virtual space). The payload pitch indicator 910 can comprise a vertical scrollbar, the up and down movements of which can correspond to the up and down movements of the payload around a pitch axis.

The payload configuration controls 909 can include a film speed control, a shutter speed control, and exposure compensation control. For example, the film speed control can be used to display the current film speed of an image capturing device and/or selecting or specify a new film speed (e.g., ISO 200, ISO 400, ISO 600, ISO 800, ISO 1000). The shutter speed control can be used to display the current shutter speed of the image capturing device and/or selecting or specify a new shutter speed (e.g., $\frac{1}{16000}$ s, $\frac{1}{8000}$ s, $\frac{1}{4000}$ s, $\frac{1}{2000}$ s, $\frac{1}{10000}$ s, $\frac{1}{500}$ s, $\frac{1}{250}$ s, $\frac{1}{125}$ s, $\frac{1}{60}$ s, $\frac{1}{30}$ s, $\frac{1}{15}$ s, $\frac{1}{8}$ s, $\frac{1}{4}$ s, $\frac{1}{2}$ s). The exposure compensation control can be used to display and/or adjust an exposure associated with the image capturing device.

In some embodiments, a flight status indicator 912 can be provided to indicate a simulated flight status of the UAV. The simulated flight status may be determined based on the current status of components of the UAV such as power supply, propulsion unit, memory, software and/or hardware components, and the like. The flight status indicator 912 can be configured to display different colors, patterns, texture, texts, or any combinations thereof to represent different flight status. For instance, the color green can be used to indicate a safe flight status. Other colors such as yellow and red can be used to indicate a more dangerous flight status. Alternatively or additionally, different textual content can be displayed by the flight status indicator 912 corresponding to different flight status. For instance, "Safe Flight" or similar text can be displayed to indicate safe flight. "Dangerous Flight" or other warning messages can be displayed to indicate a more dangerous flight. In various embodiments, the flight status indicator 912 can be disposed between the display sections 901 and 902, or anywhere else on the UI. The flight status indicator 912 may be always displayed, or only displayed in response to certain predetermined conditions, events, user actions, or the like. For instance, in some embodiments, the flight status indicator 912 may be only displayed when the UAV is near or under a dangerous flight status. As another example, the flight status indicator 912 may be displayed only when the user selects or otherwise activate a UI control.

In various embodiments, more, less, or different controls can be displayed that may be different from the illustrated UI 900. For instance, the UI may be configured to show only the image display section without showing any information display sections; or vice versa. The information displayed in various sections can be mixed and matched in different sections in other embodiments. The information displayed in the UI can be represented by graphical icons or indicators or in textual or numeric format. Additionally, the information displayed can be dynamically changed automatically or in response to user input. Different information sections may be dynamically hidden/collapsed, or shown/expanded. In some embodiments, data displayed in one section can be dynamically switched to be displayed in another section. For example, in an embodiment, the map section 904 and the image section 901 can be swapped such that image section is displayed as an inset of the map section in a picture-in-picture fashion. In some embodiments, the layout of the sections of the UI may be dynamically changed to be different than that shown in FIG. 9. For instance, the sections may be shown in in a tiled fashion or in one or more parallel panels.

FIG. 10 illustrates an exemplary user interface (UI) for displaying a simulated flight after a UAV is taken-off, in accordance with various embodiments of the present disclosure. As shown in FIG. 10, the UI 1000 may comprise one or more primary display areas or sections 1016 and one or more secondary display areas or sections 1001-1010. The primary display area 1016 may be configured to have a larger display area (e.g., more pixel counts) than any one of the secondary display sections. In some embodiments, the type of information displayed in the primary and/or secondary display areas is fixed.

In some other embodiments, the type of information displayed in the primary and/or secondary display areas can be dynamically swapped or toggled. For instance, information displayed in the primary display area 1016 can be dynamically swapped with information displayed in a secondary display area. In various embodiments, the user may toggle or swap the display via any suitable input mechanisms such as touchscreen, mouse, keyboard, voice command, and the like. In some embodiments, information displayed in one primary display area can be dynamically swapped with information displayed in another primary display area. Information displayed in one secondary display area can be dynamically swapped with information displayed in another secondary display area.

As shown in FIG. 10, the primary display area 1016 in the UI 1000 can be used to display a UAV 1011 in a simulated flight. For example, the graphical display in the primary display area 1016 can show an animation with the UAV 1011 already taken off from the originating point 1015 in a parking apron 1013. As the UAV 1011 is taking off in the simulated flight, the flight simulator (e.g. on-board of the UAV 1011) can generate simulated coordinator information for the UAV 1011 in the simulated flight, e.g. with the originating point 1015 as the original point of the coordinator system. Correspondingly, the UI 1000 can display the movement of the UAV 1011 in the simulated flight in the animation.

Alternatively, the primary display area 1016 in the UI 1000 can be used to display image data captured by a payload coupled to the UAV such as still pictures or videos, whereas the secondary display areas can be configured to display information related to a UAV and/or for receiving user input.

In various embodiments, the FOV and/or the line of sight of the payload may or may not be aligned with the direction the UAV is heading. For example, the FOV and/or line of sight of the payload may be at an angle with the UAV's heading along a yaw, pitch and/or roll axis. The angle may be greater than 0 degree, 30 degrees, 60 degrees, 90 degrees, 120 degrees, 150 degrees, 180 degrees, 210 degrees, 240 degrees, 300 degrees, and the like.

In some embodiments, the UI 1000 may provide one or more control sections 1007 and 1008 for controlling a UAV and associated payloads in a simulated flight. For example, the user may be allowed to interact with some or all of regions of the UI 1000 via one or more input mechanisms such as touchscreen, mouse, keyboard, joysticks, stylus, wearable devices, visual or audio commands, and the like. The user input provided via the UI 1000 may be used to control aspects of the display and/or display terminal, the UAV, the payload, the remote terminal, sensors, and the like.

The UI 1000 can also include one or more control sections 1007 and 1008, each including controls for selecting, activating, deactivating, modifying, or otherwise controlling one or more modes, operations, or routines of the UAV and/or components thereof. In some embodiments, control data generated based on selection of the controls can be transmitted directly or indirectly to the UAV so as to control one or more aspects of the UAV and/or the payload. At least some of the controls can be represented by graphical icons illustrative of the modes or operations associated with the controls. The graphical icons can be designed to facilitate intuitive understanding of the function of the controls without the help of any textual description. Furthermore, such "one-touch" or "one-click" control interface can simplify the process for a user to provide control, such as for selecting, activating, deactivating or otherwise controlling aspects of the UAV and/or payload. For instance, the user can use such "one-touch" or "one-click" controls to activate a predetermined and/or autonomous routine such as auto-return, autonomous takeoff, autonomous landing, hovering, and the like.

Additionally, the UI 1000 can include a reset or restart button 1014 that allows a user to stop and restart the simulated flight. The simulated flight can be restarted from the beginning, i.e. before the UAV has taken off. Also, a section of the simulated flight can be restarted, i.e. the simulated flight can be restarted from a way point along the flight path. For example, a use can take advantage of the reset or restart button 1014 to repeat practicing a part of a simulated flight. Alternatively, the UI 1000 can force a user to reset or restart a simulated flight, e.g. when training a novice pilot.

The UI 1000 can also include one or more information display sections 1001-1002. The display sections 1001-1002 can be configured to display various status information of a UAV in a simulated flight, such as the information related to power supply, communication, data storage capacity, navigation state, sensor state, and the like.

The UI 1000 can include a flight display section, such as an icon display section 1003 (or attitude sphere) and a flight parameters display section 1006. The flight display section can be used for displaying position, attitude, speed, and other flight information related to the UAV. In particular, the flight display section can be configured to simultaneously display both UAV state information and payload state information.

Also, the UI 1000 can include a map section 1004 that can be used to display the current position and/or orientation of the UAV on a map (e.g., satellite map). The map can be further configured to indicate the current position and/or orientation of a remote control terminal, a home point, a flight path of the UAV, and the like. Additionally, the map can be configured to indicate the orientation and/or angle of a FOV of an image sensor on the UAV. In some embodiments, the map section 1004 can be displayed as an inset of the image section 1016 in a picture-in-picture fashion. In other embodiments, the map section 904 may not overlap the image section 1016.

Additionally, the UI 1000 can include other information sections such as a wind indicator 1005, a payload pitch indicator 1010 and various payload configuration controls 1009. The wind indicator 1005 can display the simulated speed and direction of the wind in the field (i.e. the virtual space). The payload pitch indicator 910 can comprise a vertical scrollbar, the up and down movements of which can correspond to the up and down movements of the payload around a pitch axis. The payload configuration controls 1009 can include a film speed control, a shutter speed control, and exposure compensation control.

In some embodiments, a flight status indicator 1012 can be provided to indicate a simulated flight status of the UAV. The simulated flight status may be determined based on the current status of components of the UAV such as power supply, propulsion unit, memory, software and/or hardware components, and the like. The flight status indicator 1012 can be configured to display different colors, patterns, texture, texts, or any combinations thereof to represent different flight status.

Figure 11:
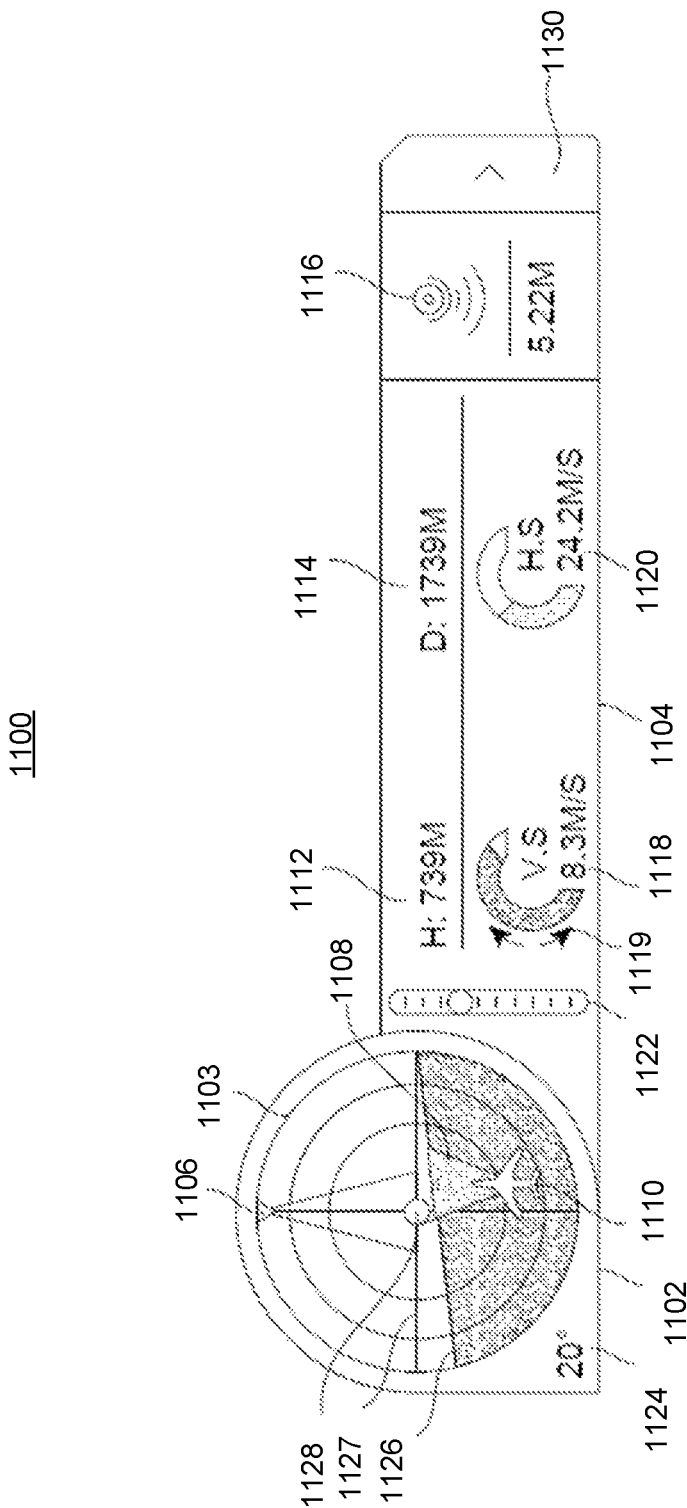
FIG. 11 illustrates an exemplary flight display section for a simulated flight, in accordance with various embodiments of the present disclosure.

FIG. 11 illustrates an exemplary flight display section for a simulated flight, in accordance with various embodiments of the present disclosure. As shown in FIG. 11, the flight display section 1100 can be used to display position, attitude, speed, and other flight information related to the UAV and/or payload(s) in a simulated flight. Said flight information can be displayed within one or more display regions or sections within the flight display section 1100.

The flight display section 1100 can include an icon display section 1102 (or an attitude sphere) and a flight parameters display section 1104. The icon display section 1102 can be used at least partially to display state information of the UAV, state information of the payload, state information of a remote terminal, or any combinations there- For instance, the flight display section 1102 can be configured to simultaneously display both UAV state information and payload state information in a simulated flight. The flight display section 1102 can be configured to simultaneously display both UAV state information and remote terminal state information in a simulated flight. The flight display section 1102 can be configured to simultaneously display both UAV state information, payload state information, and remote terminal state information in a simulated flight.

The icon display section 1102 can comprise a substantially circular region 1103 that is in fashion similar to a top-down radar map. The icon display section 1102 can be used to illustrate the relative positioning and bearings of the UAV and a remote terminal (e.g., remote control terminal and/or remote display terminal) in a simulated flight. The UAV can be represented by a UAV icon 1110 and the remote terminal can be represented by a remote terminal icon 1128.

In some embodiments, the remote terminal icon 1128 is displayed at the center of the substantially circular region 1103. The scale of the substantially circular region 1103 can be represented by one or more concentric range rings that radiate from the center. The radii of the range rings can correspond to actual distance from the center such as 100 meters, 200 meters, 300 meters (or 10 miles, 20 miles, 30 miles) and the like according to a predetermined ratio or scale. In some embodiments, the scale of the substantially circular region 1103 can be dynamically adjusted to fit both the remote terminal and the UAV in the substantially circular region 1103. For instance, when the distance increases between the UAV and the remote terminal, the number of range rings can increase; alternatively and/or additionally, the radii can be scaled up to represent longer distances. The opposite may be true when the distance between the UAV and the remote terminal decreases.

The orientation of the remote terminal can be indicated by a remote terminal orientation indicator 1106. The remote terminal orientation indicator 1106 can be located on the periphery of the substantially circular region and moves correspondingly when the remote terminal turns, e.g., around a yaw axis. In an example, the direction of the orientation indicator 1106 can correspond to the direction a user operating the remote terminal is facing. In some embodiments, the orientation of the remote terminal may be measured by a magnetometer and/or GPS sensor associated with the remote terminal.

In some embodiments, the orientation of the UAV can be indicated by an orientation of the UAV icon 1110 such as indicated by the pointing direction of the nose of UAV as shown by the UAV icon 1110. The orientation of the UAV can include an orientation of the UAV around a yaw axis. The UAV indicator 1110 can be associated with a field of view (FOV) indicator 1108. The FOV of the UAV can correspond to the FOV of a payload carried by the UAV or the FOV of any visual or image sensor onboard the UAV. The FOV indicator 1108 can be shown as a substantially cone shape projecting from the UAV. The relative yaw angle of the FOV (e.g., the angle between the midline of the cone and the heading of the UAV) can correspond to a yaw angle of the payload or a visual sensor relative to the yaw angle of the UAV. By default relative yaw angle of the FOV may be the same as the heading of the UAV and thus zero. In some cases, the carrier of the payload may cause a relative yaw angle between the pointing direction of the payload and the heading of the UAV.

In some embodiments, the angle of the cone shape (e.g., the angle between the two straight lines defining the cone) can correspond to an actual FOV of the payload. Alternatively, the angle of the cone shape may be an arbitrary angle that does not necessarily correspond to the actual FOV of the payload. In some embodiments, an angle of yaw/roll rotation of the carrier and/or payload can be displayed in numeric format by a yaw/roll angle indicator in the icon display section 1102.

The substantially circular region 1103 can also function as a UAV attitude display that illustrate an orientation of the UAV, e.g., around a pitch axis and/or a roll axis. For example, a payload roll/pitch indicator 1126 can comprise a line that extends between two points on the periphery of the substantially circular region 1103. The tilting of the line 1126 can be used to indicate a roll orientation of the UAV. For instance, a leveled or horizontal line 1126 parallel to the horizon 1127 can indicate zero roll rotation of the UAV. A counter clockwise tilt of the line 1126 relative to the horizon 1127 (i.e., the leftmost point of the line is lower than the rightmost end of the line) can indicate a corresponding counter clockwise roll of the UAV (from the UAV's perspective). Likewise, a clockwise tilt of the line 1126 relative to the horizon 1127 (i.e., the leftmost end of the line is higher than the rightmost end of the line) can indicate a corresponding clockwise roll of the UAV (from the UAV's perspective).

Additionally or alternatively, the rise and fall of the line 1126 relative to the horizon 1127 can be used to indicate a pitch orientation of the UAV. For instance, a horizontal line through the center of the substantially circular region can indicate a zero pitch rotation of the UAV relative to the horizon 1127. A rise of the line 1126 towards the top of the substantially circular region 1103 can indicate an upward tilt around the pitch axis. A fall of the line 1126 towards the bottom of the substantially circular region 1103 can indicate a downward tilt around the pitch axis.

In some embodiments, the payload can be allowed to move rotationally around one, two, or three axes of the relative to the UAV. The axes can include a pitch axis, a roll axis, a yaw axis, or any combinations thereof. As such, in some alternative embodiments, the substantially circular region 1103 can also function as a payload attitude display that illustrate an orientation of the carrier and/or payload, e.g., around a pitch axis and/or a roll axis. For example, a payload roll/pitch indicator 1126 can comprise a line that extends between two points on the periphery of the substantially circular region 1103. The tilting of the line 1126 can be used to indicate a roll orientation of the payload and/or carrier. For instance, a leveled or horizontal line 1126 can indicate zero roll rotation of the payload relative to the UAV. A counter clockwise tilt of the line 1126 (i.e., the leftmost point of the line is lower than the rightmost end of the line) can indicate a corresponding clockwise roll of the payload relative to the UAV. Likewise, a clockwise tilt of the line 1126 (i.e., the leftmost end of the line is higher than the rightmost end of the line) can indicate a corresponding counter clockwise roll of the payload relative to the UAV.

Additionally or alternatively, the rise and fall of the line 1126 can be used to indicate a pitch orientation of the payload and/or carrier. For instance, a horizontal line through the center of the substantially circular region can indicate a zero pitch rotation of the payload relative to the UAV. A rise of the line 1126 towards the top of the substantially circular region 603 can indicate an upward tilt around the pitch axis. A fall of the line 1126 towards the bottom of the substantially circular region 603 can indicate a downward tilt around the pitch axis.

In some embodiments, the yaw orientation of UAV can be illustrated by the orientation of the UAV icon 1110. The pitch and roll orientation of the UAV can be illustrated by the level indicator 1126 in the substantially circular region 1103. The yaw and roll orientation of payload can be illustrated by the FOV indicator 1108 and the roll angle indicator 1124, respectively.

In some embodiments, the pitch orientation of the payload (or the line of sight thereof) can be illustrated by a payload pitch indicator 1122 comprising a vertical scrollbar. The pitch indicator can be disposed in the icon display section 1102 (Alternatively, the payload pitch indicator 1122 can be displayed in a primary display section in a UI for easy control). The up and down movements of the scrollbar can correspond to the up and down movements of the payload around a pitch axis. In some embodiments, the pitch indicator 1122 can optionally include a direction indicator showing the direction of the pitch movement of the payload. In some embodiments, the pitch indicator 1122 is always displayed. In some other embodiments, the pitch indicator 1122 is not displayed by default but only displayed when there is a non-zero angle between the pitch orientation of the payload and the pitch orientation of the UAV. The direction indicator can comprise an up control and/or a down control that may become activated (e.g., via change in color, shape, or other characteristics) when the pitch angle reaches or exceeds a certain predetermined range.

In some embodiments, the orientation indicators described above are configured to only display information. Additional controls are required to control or otherwise change an orientation (e.g., pitch/yaw/roll). In some other embodiments, the orientation indicators described above are configured to both display information and receive user input to control the respective orientations of the UAV and/or payload.

The flight parameters display section 1104 can be used to display flight parameters of the UAV such as distances and speeds. The flight parameters display section 1104 can be displayed adjacent to or separate from the icon display section 1102. As illustrated, the flight parameters display section 1104 can include a vertical distance indicator 1112 and a horizontal distance indicator 1114 used to show the vertical distance and the horizontal distance, respectively, between the UAV and a predetermined reference point such as a home point, a remote control terminal and/or the remote display terminal, or any other reference point or location.

The flight parameters display section 1104 can include a vertical speed indicator 1118 and a horizontal speed indicator 1120 used to show the vertical speed and horizontal speed in a simulated flight, respectively, of the UAV relative to a predetermined frame of reference (e.g., relative to the ground, the wind, the remote controller, or other objects). For instance, the displayed speeds can include a vertical speed, a groundspeed, or an airspeed in a simulated flight. Additionally, the vertical speed indicator 1118 can also include a direction indicator 1119 indicative of the direction of the vertical movement of the UAV. For example, the direction indicator 1119 can include an up arrow and a down arrow. The up arrow can highlighted or otherwise displayed as active when the UAV is moving upward. Likewise, the down arrow can highlighted or otherwise displayed as active when the UAV is moving downward.

The flight parameters display section 1104 can also include a proximity indicator 1116 used to indicate proximity of the UAV to a reference object. The reference object can include an object in the surrounding of the UAV such as on or near the flight path of the UAV. For example, proximity indicator 1116 can be used to indicate proximity to obstacles surrounding the UAV. The proximity may be measured from the UAV to a surface of the object such as any surface of a building, a ground, a tree, or the like. The obstacle may or may not be located within a predetermined range from the UAV. The predetermined range may be determined by a maximum and/or minimum detection range of a proximity sensor that is used to detect the obstacle. Examples of the proximity sensor may include a lidar sensor, an ultrasound sensor, an infrared sensor, a visual sensor, and the like. In some embodiments, the reference point can also include a location of the remote control terminal and/or the display terminal, a home point for the UAV to return, or any other waypoint. In some embodiments, the proximity indicator 1116 can include a proximity icon along with a numeric representation of the proximity from the UAV to the reference point. In some embodiments, more than one proximity indicators may be provided to indicate proximity to more than one reference points.

In some embodiments, a warning may be provided if the proximity between the UAV and the reference point is outside a predetermined range. For example, the warning may be given if the UAV is within a predetermined minimum distance from an object, thereby indicating an imminent collision with an object. As such, the warning and the proximity indicator 1116 may allow a user operating the UAV to avoid such obstacles in a timely manner. As another example, the warning may be given if the UAV is farther than a predetermined distance from an object. The object may include a target object that the user intends to track. The object may include a remote controller with a limited control range. As such, the warning and the proximity indicator 1116 may allow the user to maneuver the UAV to come back closer to the object, for example, to prevent loss of control of the UAV.

In various embodiments, the warning can include a visual signal, an audio signal, a tactile feedback, or any combination thereof. The warning signals may be provided via the remote display terminal, remote control terminal, the UAV, or some other devices. For example, a visual warning may be represented visually by a red or flashing proximity indicator 616 or some other visual indicators on the display terminal. Additionally or alternatively, an audio warning may be provided that may include a beeping sound, an alarm sound, a piece of music, a human voice, or any combination thereof. Additionally or alternatively, a tactile feedback may be provided that may include a vibration, an application of force, or a movement that can be felt by a user operating the remote display terminal and/or the remote control terminal. For example, the tactile feedback may be represented by a vibration of remote display terminal and/or the remote control terminal.

In some embodiments, at least some of the icons or controls displayed in the flight display section 1100 may be selectable by a user. The selection of such selectable controls may cause further information to be displayed in addition to or instead of the currently displayed information. For example, selection of the control 1130 may cause additional controls to be displayed for controlling settings associated with the payload such as for controlling a film speed, shutter speed, exposure compensation, and the like. As another example, selection of the UAV icon 1110 can cause the display of a three-dimensional depiction of the UAV's spatial disposition relative to a remote terminal (e.g., remote control terminal and/or remote display terminal). The depiction may include an orientation of the UAV around the pitch, yaw, and roll axis as perceived by a remote terminal or according to some other point of reference.

In some embodiments, at least some aspects of the flight display section 1100 can be customized by a user. For example, a user may change, via the user interface, the perspective or the frame of reference associated with the display section 1102. Instead of a top-down view showing both the remote terminal and the UAV in a simulated flight, the icon display section may be configured show only the relative spatial disposition of the UAV as perceived by the remote terminal. As another example, a user can change the units and/or precision of values shown in the flight parameters display section 1104 such as speed and distance in a simulated flight.

FIG. 12 illustrates an exemplary map section, in accordance with various embodiments of the present disclosure. The map section 1200 can be used to display the current positions of the UAV in a simulated flight, the remote terminal (e.g., remote control terminal and/or remote display terminal), and/or a reference point such as a home point. The map section 1200 can also be used to display FOV of the UAV and/or a flight path 1205 of the UAV.

The map section 1200 can include a UAV icon 1202, a remote terminal indicator, and a reference point indicator 1203, which are positioned on a map 1201. The reference point indicated by the reference point indicator 1203 may include a home point or some other suitable point. The map 1201 can include geographical features of a region such as land, water, forest, roads, buildings, and the like. The map 1201 can be generated based on satellite images, GPS data, geological surveys, and the like. In some embodiments, the data used to generate the map 1201 may be obtained from a local or remote data store, servers, cloud-based services, satellites, and the like. The map can correspond to an actual geographic region according to some predetermined ratio or scale. The positions of the UAV icon 1202, the remote terminal indicator, and the reference point indicator 1203 on the map 1201 can correspond proportionately to their respective positions in the geographic region according to the scale of the map. In some embodiments, the map may be scaled so as to display all of the UAV, remote terminal, reference point, or any other objects of interest. In other embodiments, the map only displays a subset of the objects of interests above.

The UAV icon 1202 may be used to indicate a position of the UAV on the map and/or an orientation of the UAV in a simulated flight. The orientation of the UAV may be indicated by the pointing direction of the nose of UAV as shown by the UAV icon 1202. The orientation of the UAV that is displayed can correspond to a heading or a yaw orientation of the UAV. The field of view (FOV) indicator 1204 can be provided to indicate a field of view (FOV) of the UAV. The FOV of the UAV can correspond to the FOV of a payload carried by the UAV or the FOV of any visual or image sensor onboard the UAV. The FOV indicator 1204 can be shown as a substantially cone shape projecting from the UAV. The pointing direction of the cone can correspond to a yaw angle or orientation of the payload or any other suitable visual sensor. The yaw angle of the payload or any other visual sensor may be the same as the UAV. In some embodiments, the carrier that couples the payload to the UAV may permit the payload to move rotationally around a yaw axis relative to the UAV. In such cases, the yaw orientation of the payload may be different from the yaw orientation of the UAV. In some embodiments, the angle of the cone shape can correspond to an actual FOV of the payload. Alternatively, the angle of the cone shape may be an arbitrary angle that does not necessarily correspond to the actual FOV of the payload. Advantageously, the FOV indicator 1204 allows a user to see the direction and/or angle range of the FOV of the UAV as projected onto a map, thereby easily understanding the approximate range of landscape that can be captured by the payload or visual sensor.

The orientation of the remote terminal indicator can be shown with an orientation indicator. The orientation indicator can also be substantially cone-shaped. The direction of projection of the cone shape can correspond to the direction a user operating the remote terminal is facing. The direction as indicated by the orientation indicator can change in correspondence with a change in orientation of the remote terminal.

The map section 1200 can also include a flight path indicator 1205. The flight path indicator 1205 can represent a simulated flight path of the UAV. In some embodiments, data required for generating the flight path can be received from the UAV. The data can include position information (e.g., simulated GPS coordinates) of a series of waypoints along the flight path. Alternatively, the received data can be relative position information (e.g. with a predetermined location as the original point). Then, the relative position information can be combined with the location information at the user terminal to derive the simulated flight path that is displayed. In some embodiments, a user can customize the displayed flight path by specifying the start location/time, end location/time, duration of the flight path, and other parameters.

In some embodiments, the system can determine a flight path of the UAV in the simulated flight based on the received coordinate information of the UAV and the location information of the user terminal. For example, the location information may include the longitude and latitude information of the user terminal, which is used as the take-off point of the UAV in the simulated flight. Also, the system can determine the altitude information based on the available geographic information that may be stored in the user terminal or received from a remote server. Then, a flight path of the UAV in the simulated flight can be displayed on a map section 1200.

Also, the map section 1200 can also include a return path indicator 1206. When an automatic return task is performed in the simulated flight, the UAV can use the return path in the virtual space. Additionally, a user can interact with the return path indicator 1206 for configuring a return path in the simulated flight, such as landing at a selected location in the map.

The map section 1200 can also include an eraser control 1209. The eraser control 1209 can be used to remove some or all portions of the flight path displayed by the flight path indicator 1205. In an embodiment, selection of the eraser control 1209 causes the all the flight path so far to be erased from the map display. In another embodiment, a user can select the eraser control 1209 and uses it to erase a portion of the flight path being displayed. In some embodiments, additional flight path after the erasure may still be recorded and/or displayed. In other embodiments, the eraser control 1209 can be used to turn off/on the recording and/or display of the flight path.

The map section 1200 can also include a reference control, which can be used to select from a plurality of display modes with varying frames of reference. For example, the reference frame under a first display mode may be the UAV. As such, the heading of the UAV is displayed as fixed (e.g., nose of the UAV pointing upward). Non-UAV objects in the map (e.g., remote terminal, reference points, geographical objects) are shown as relative to the fixed UAV heading and change their orientations when the heading of the UAV changes. The reference frame under a second display mode may be the remote terminal. As such, the heading of the remote terminal is fixed and the non-remote-terminal objects in the map (e.g., UAV, buildings, geographical objects) are shown as relative to the fixed heading of the remote terminal and change their orientations when the heading of the remote terminal changes. The reference frame under a third display mode may be the earth. As such, the geographical objects such as buildings in the map have a fixed orientation (e.g., north, south, west and east). When heading of the UAV or the remote terminal change, the corresponding changes are represented in the map. In some embodiments, the reference control can be represented by different icons to visually indicate the current selected display mode and/or the next available display mode. For example, an icon of an aircraft may be displayed when the first mode is selected. An icon of a remote terminal may be displayed when the second mode is selected. An icon of a compass may be displayed when the third mode is selected.

The map section 1200 can also include a scale control 1208. The scale control 1208 can be used to select a display mode from a plurality of display modes with varying scales. For instance, the scale control 1208 may allow a user to select or toggle between a first display mode and a second display mode. Under the first display mode, a scale of the map may be increased automatically (e.g., from 1:1,000,000 to 1:5,000,000) so as to display all points of interest such the UAV, the remote terminal and the reference point. The map under the first mode allows a user to easily see a global relationship among all points of interest. Under the second display mode, the map may be scaled down automatically to display only a subset of the points of interest. For example, map under the second display mode may only display a portion of the map under the first display mode. For instance, the map under the second mode allows a user to focus only on the region surrounding the UAV. In some other embodiments, the scale control 1208 may be configured to allow a user to switch among three, four, or more different display mode. For instance, the map under the third mode may have a scale that is between the map scale under the first mode and the map scale under the second mode. The map under the third mode may, in an example, be used to display more points of interest than the first mode but less points of interest than the third mode. In some embodiments, scale control 1208 can be represented by different icons to visually indicate the current selected display mode and/or the next available display mode. For example, a zoom-in icon may be displayed when the current display mode has a large map scale whereas a zoom-out icon may be displayed when current display mode has a small map scale. Advantageously, the scale control 1208 enables a user to easily switch (e.g., via a one-button click) between the different viewing modes without taking up further display area.

In some embodiments, at least some aspects of the map section 1200 can be customized by a user. For example, a user may specify the points of interest to be displayed on the map. The points of interest may include only the UAV and the remote terminal, only the UAV and the reference point, or the like. In some embodiments, the user may add more points of interest than illustrated. For instance, the user may add one, two, three, or more reference points to be shown on the map by clicking on the map. In some embodiments, the user can add or remove information that is displayed on the map. For example, the user may be allowed to activate or deactivate the FOV indicator 1204 and/or the remote terminal orientation indicator 1205. In other embodiments, the user may be allowed to zoom in on a particular portion of the map, zoom out, toggle between satellite and street view, or perform other functionalities.

Figure 13:
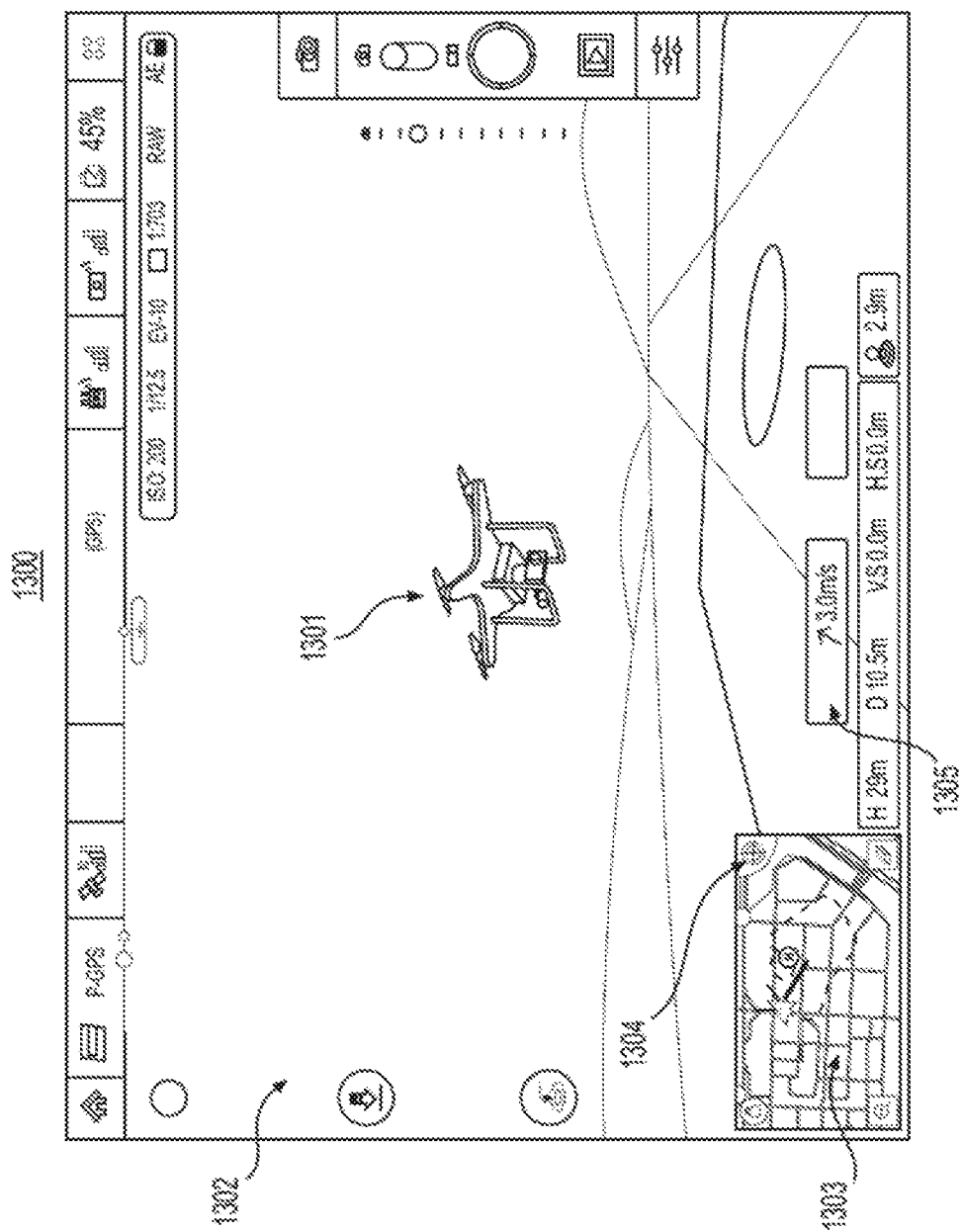
FIG. 13 illustrates another exemplary user interface (UI) for displaying a UAV in a simulated flight after taken-off, in accordance with various embodiments of the present disclosure.

FIG. 13 illustrates another exemplary user interface (UI) for displaying a UAV in a simulated flight after taken-off, in accordance with various embodiments of the present disclosure. As shown in FIG. 13, a user terminal may display a different UI 1300 when the user terminal connects to a different type of UAV (also with a different UAV image 1301 in the animation and using different physical model for flight simulation).

The UI 1300 may comprise one or more primary display areas or sections 1302 and one or more secondary display areas or sections 1303-1304. As shown in FIG. 13, a map section 1303 and other secondary display areas can be displayed dynamically swapped or toggled.

Figure 14:
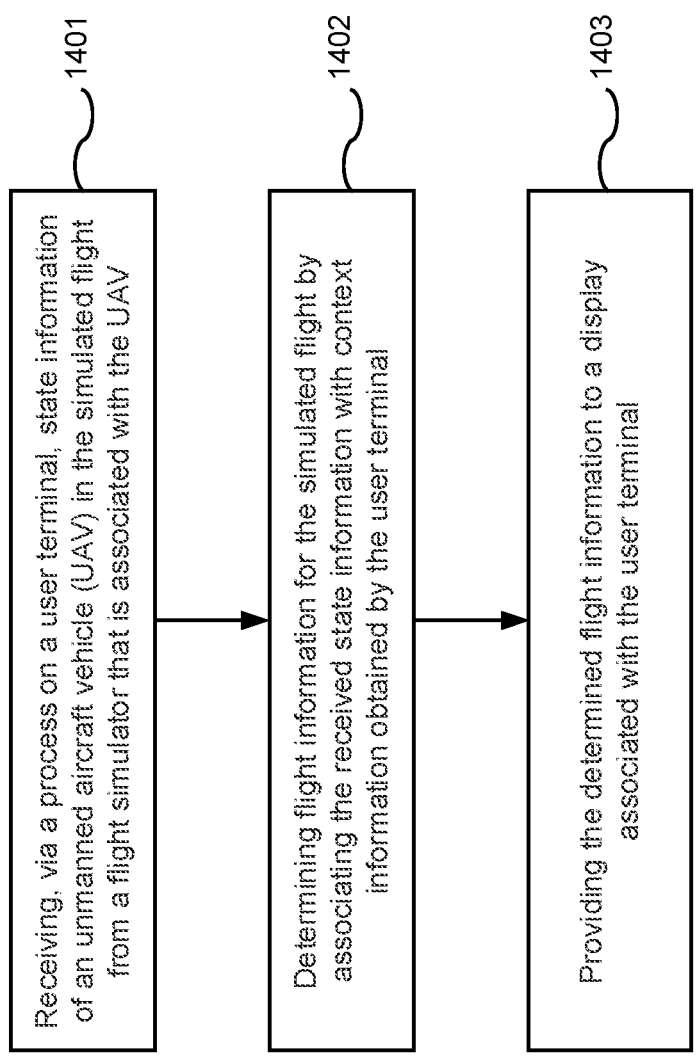
FIG. 14 shows a flowchart of data recording with tags, in accordance with various embodiments of the present disclosure.

FIG. 14 shows a flowchart of data recording with tags, in accordance with various embodiments of the present disclosure. As shown in FIG. 14, at step 1401, a process on a user terminal can receive state information of a UAV in the simulated flight from a flight simulator that is associated with the UAV. Then, at step 1402, the process can determine flight information for the simulated flight by associating the received state information with context information obtained by the user terminal. Furthermore, at step 1403, the process can provide the determined flight information to a display associated with the user terminal.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of supporting a simulated movement of a movable object comprising:
receiving, via a process of a user terminal, state information of a virtual movable object in the simulated movement from a movement simulator that is associated with the movable object, the state information including information identifying a location of the virtual movable object in a virtual space;
determining movement information for the simulated movement by associating the received state information with context information obtained by the process of the user terminal, the context information including information identifying a location of the user terminal, the user terminal being at a different location than the movable object in a real space;
displaying the simulated movement of the virtual movable object on a display associated with the user terminal based on the movement information; and
receiving control data to control the simulated movement of the virtual movable object in the virtual space using the user terminal when the movable object is in simulation and to control movement of the movable object in the real space when the movable object is in real operation.

2. The method of claim 1, further comprising:
establishing a connection between the user terminal and the movement simulator; and
sending one or more control signals to the movement simulator.

3. The method of claim 1, further comprising:
resetting or restarting at least a part of the simulated movement.

4. The method of claim 1, further comprising:
displaying a user interface associated with the movable object on the display associated with the user terminal.

5. The method of claim 4, further comprising:
displaying a different user interface on the display associated with the user terminal, when the user terminal is connected with a movement simulator that is associated with a different movable object.

6. The method of claim 1, further comprising:
displaying an animation of the virtual movable object in the simulated movement on the display associated with the user terminal.

7. The method of claim 1, wherein:
the state information further includes coordinate information of the virtual movable object relative to an originating point of the virtual movable object in the simulated movement, and
the context information further includes longitude and latitude information of the originating point of the virtual movable object in the simulated movement.

8. The method of claim 7, further comprising:
determining a movement path of the virtual movable object in the simulated movement based on the coordinate information of the virtual movable object and the longitude and latitude information of the originating point of the virtual movable object in the simulated movement.

9. The method of claim 8, further comprising:
displaying the movement path of the virtual movable object in the simulated movement on a map section of the display associated with the user terminal.

10. The method of claim 1, further comprising:
displaying at least one of attitude information or payload status information of the virtual movable object on the display associated with the user terminal.

11. The method of claim 1, further comprising:
displaying a fictional or predetermined view based on a predetermined terrain model in an animation on the display associated with the user terminal.

12. The method of claim 1, wherein:
the process is used by an application on the user terminal, the application allowing a user to configure and operate the virtual movable object in the simulated movement.

13. The method of claim 1, further comprising:
determining the location of the movable object in the simulated movement based on a priority list including information received from the movable object, a remote control, and an application on the user terminal.

14. The method of claim 1, wherein:
the user terminal includes at least one of a control terminal or a display terminal.

15. A user terminal for supporting a simulated movement of a movable object comprising:
a processor; and
a memory storing instructions that, when executed by the processor, cause the processor to:
receive state information of a virtual movable object in the simulated movement from a movement simulator that is associated with the movable object, the state information including information identifying a location of the virtual movable object in a virtual space;
determine movement information for the simulated movement by associating the received state information with context information obtained by the process of the user terminal, the context information including information identifying a location of the user terminal, the user terminal being at a different location than the movable object in a real space;
cause a display associated with the user terminal to display the simulated movement of the virtual movable object based on the movement information; and
receive control data to control the simulated movement of the virtual movable object in the virtual space using the user terminal when the movable object is in simulation and to control movement of the movable object in the real space when the movable object is in real operation.

16. The user terminal of claim 15, wherein the instructions further cause the processor to:
establish a connection between the user terminal and the movement simulator; and
send one or more control signals to the movement simulator.

17. The user terminal of claim 15, wherein the instructions further cause the processor to:
display an animation of the virtual movable object in the simulated movement on the display associated with the user terminal.

18. The user terminal of claim 15, wherein:
the state information further includes coordinate information of the virtual movable object relative to an originating point of the virtual movable object in the simulated movement, and
the context information further includes longitude and latitude information of the originating point of the virtual movable object in the simulated movement.

19. The user terminal of claim 18, wherein the instructions further cause the processor to:
determine a movement path of the virtual movable object in the simulated movement based on the coordinate information of the virtual movable object and the longitude and latitude information of the originating point of the virtual movable object in the simulated movement.

20. The user terminal of claim 19, wherein the instructions further cause the processor to:
display the movement path of the virtual movable object in the simulated movement on a map section of the display associated with the user terminal.

* * * * *